(12) United States Patent
Khamis et al.

(10) Patent No.: US 10,540,439 B2
(45) Date of Patent: Jan. 21, 2020

(54) SYSTEMS AND METHODS FOR IDENTIFYING EVIDENTIARY INFORMATION

(71) Applicant: MARCA RESEARCH & DEVELOPMENT INTERNATIONAL, LLC, Burbank, IL (US)

(72) Inventors: Mahmoud Azmi Khamis, Burbank, IL (US); Bruce Golden, Chicago, IL (US); Rami Ikhreishi, Raleigh, NC (US)

(73) Assignee: MARCA RESEARCH & DEVELOPMENT INTERNATIONAL, LLC, Burbank, IL (US)

( * ) Notice: Subject to any disclaimer, the term of this patent is extended or adjusted under 35 U.S.C. 154(b) by 8 days.

(21) Appl. No.: 15/488,708

(22) Filed: Apr. 17, 2017

(65) Prior Publication Data

US 2017/0300470 A1 Oct. 19, 2017

Related U.S. Application Data

(60) Provisional application No. 62/323,118, filed on Apr. 15, 2016.

(51) Int. Cl.
*G06F 17/27* (2006.01)
(52) U.S. Cl.
CPC .......... *G06F 17/271* (2013.01); *G06F 17/277* (2013.01); *G06F 17/2735* (2013.01); *G06F 17/2775* (2013.01); *G06F 17/2785* (2013.01)
(58) Field of Classification Search
CPC .... G06F 17/241; G06F 17/242; G06F 17/278; G06F 17/2795; G06F 17/28; G06F 17/30011; G06F 17/30336; G06F 17/30616; G06F 17/2765; G06F 17/2845; G06F 17/289; G06F 17/2217; G06F 17/22; G06F 17/2785; G06F 17/277; G06F 17/2735;

(Continued)

(56) References Cited

U.S. PATENT DOCUMENTS 5,325,293 A 6/1994 Dorne
5,692,176 A * 11/1997 Holt ...................... G06F 17/274

(Continued)

FOREIGN PATENT DOCUMENTS

CN 101625680 1/2010
WO WO2008137090 11/2008

OTHER PUBLICATIONS

Journal of Ahima, American Health Information Management Association. © 2017, as accessed on Feb. 15, 2018. http://journal.ahima.org/.

(Continued)

*Primary Examiner* — Abdelali Serrou
(74) *Attorney, Agent, or Firm* — Patterson Thuente Pedersen, P.A.

(57) ABSTRACT

Systems and methods for semantically analyzing digital information. A cognitive engine is configured to determine useful evidentiary information from large digital content data sets. Further, the cognitive engine can analyze or manipulate the evidentiary information to derive data needed to solve problems, identify issues, and identify patterns. The results can then be applied to any application, interface, or automation as appropriate.

20 Claims, 19 Drawing Sheets

(58) Field of Classification Search
CPC ............... G06F 17/2775; G06F 17/271; G06F 17/2755; G06F 17/2705; G06F 17/27; G06F 17/211; G06F 16/24578; G06F 3/121; G06F 17/2247; G06F 8/456; G06F 17/2745

See application file for complete search history.

(56) References Cited

U.S. PATENT DOCUMENTS

| | | | |
|---|---|---|---|
| 5,774,833 | A | 6/1998 | Newman |
| 6,021,403 | A | 2/2000 | Horvitz et al. |
| 6,233,570 | B1 | 5/2001 | Horvitz et al. |
| 6,533,724 | B2 | 3/2003 | McNair |
| 6,601,055 | B1 | 7/2003 | Roberts |
| 6,687,685 | B1 | 2/2004 | Sadeghi et al. |
| 7,113,943 | B2 | 9/2006 | Bradford et al. |
| 7,200,435 | B2 | 4/2007 | Ricci et al. |
| 7,200,808 | B1* | 4/2007 | Nagao ................ G06F 3/0481 707/999.01 |
| 7,213,174 | B2 | 5/2007 | Dahlquist et al. |
| 7,222,079 | B1 | 5/2007 | Seare et al. |
| 7,249,040 | B1 | 7/2007 | Binns et al. |
| 7,301,093 | B2 | 11/2007 | Sater et al. |
| 7,389,347 | B2 | 6/2008 | Brodie et al. |
| 7,433,853 | B2 | 10/2008 | Brockway et al. |
| 7,447,667 | B2 | 11/2008 | Gong et al. |
| 7,472,121 | B2 | 12/2008 | Kothari et al. |
| 7,529,685 | B2 | 5/2009 | Davies et al. |
| 7,536,357 | B2 | 5/2009 | Boyer et al. |
| 7,536,372 | B2 | 5/2009 | Cox et al. |
| 7,555,438 | B2 | 6/2009 | Binns et al. |
| 7,590,310 | B2 | 9/2009 | Retterath et al. |
| 7,606,405 | B2 | 10/2009 | Sawyer et al. |
| 7,624,030 | B2 | 11/2009 | Feder et al. |
| 7,650,321 | B2 | 1/2010 | Krishnan et al. |
| 7,669,871 | B2 | 3/2010 | Watarai |
| 7,761,783 | B2* | 7/2010 | Lahman ................ G06F 3/121 715/234 |
| 7,650,272 | B2 | 11/2010 | Przytula et al. |
| 7,962,326 | B2 | 6/2011 | Tsourikov et al. |
| 8,312,067 | B2 | 11/2012 | Elias et al. |
| 8,459,680 | B2 | 6/2013 | Chamberlain |
| 8,666,928 | B2 | 3/2014 | Tunstall-Pedoe |
| 9,075,849 | B2 | 7/2015 | Barney |
| 10,248,662 | B2* | 4/2019 | Wu ..................... G06F 16/583 |
| 2002/0002474 | A1 | 1/2002 | Michelson et al. |
| 2002/0082868 | A1 | 6/2002 | Pories et al. |
| 2002/0103799 | A1* | 8/2002 | Bradford .......... G06F 17/30687 |
| 2002/0114524 | A1* | 8/2002 | Crepy ................ G06F 17/2765 382/229 |
| 2004/0139397 | A1* | 7/2004 | Yuan .................. G06F 17/2785 715/255 |
| 2004/0250166 | A1 | 12/2004 | Dahlquist et al. |
| 2005/0043922 | A1 | 2/2005 | Weidl et al. |
| 2005/0049988 | A1 | 3/2005 | Dahlquist et al. |
| 2005/0074834 | A1 | 4/2005 | Chaplen et al. |
| 2005/0118557 | A1 | 6/2005 | Sumner, II et al. |
| 2005/0234740 | A1 | 10/2005 | Krishnan et al. |
| 2005/0246306 | A1 | 11/2005 | Evans-Beauchamp et al. |
| 2007/0043761 | A1 | 2/2007 | Chim et al. |
| 2007/0118399 | A1 | 5/2007 | Avinash et al. |
| 2007/0192143 | A1 | 8/2007 | Krishnan et al. |
| 2007/0288840 | A1* | 12/2007 | Girle .................. G06F 17/2247 715/234 |
| 2008/0010522 | A1 | 1/2008 | Uwatoko et al. |
| 2008/0020379 | A1 | 1/2008 | Agan et al. |
| 2008/0033894 | A1 | 2/2008 | Steck et al. |
| 2008/0126054 | A1* | 5/2008 | Cohen ................ G06Q 10/06 703/13 |
| 2008/0178067 | A1* | 7/2008 | Lahman ................ G06F 3/121 715/200 |
| 2008/0209269 | A1 | 8/2008 | Brodie et al. |
| 2008/0214928 | A1 | 9/2008 | Rosales et al. |
| 2008/0243799 | A1 | 10/2008 | Rozich et al. |
| 2008/0275731 | A1 | 11/2008 | Rao et al. |
| 2009/0254328 | A1 | 10/2009 | Chbat et al. |
| 2010/0031132 | A1* | 2/2010 | Yamaji ................ G06F 17/211 715/203 |
| 2010/0324924 | A1 | 12/2010 | Frederiksen |
| 2011/0167381 | A1* | 7/2011 | Kahn .................. G06F 17/2745 715/786 |
| 2011/0301982 | A1 | 12/2011 | Green et al. |
| 2012/0079364 | A1* | 3/2012 | Agarwal ............... G06F 8/456 715/234 |
| 2012/0284200 | A1 | 11/2012 | Pedersen |
| 2013/0138665 | A1 | 5/2013 | Hu |
| 2013/0282735 | A1 | 10/2013 | Pedersen et al. |
| 2013/0339202 | A1 | 12/2013 | Zhao et al. |
| 2014/0012685 | A1* | 1/2014 | Le Chevalier ......... G06Q 30/02 705/14.73 |
| 2014/0032574 | A1 | 1/2014 | Khan |
| 2014/0164408 | A1* | 6/2014 | Dubbels ............. G06F 17/2705 707/755 |
| 2015/0113388 | A1* | 4/2015 | Barrett ............. G06F 16/24578 715/249 |
| 2015/0120935 | A1* | 4/2015 | Fukasawa ............... H04L 47/74 709/226 |
| 2015/0161117 | A1* | 6/2015 | Bhagwat ................. G06F 17/27 707/771 |
| 2015/0317285 | A1* | 11/2015 | Duggal ................ G06F 17/211 715/242 |
| 2015/0324350 | A1* | 11/2015 | Bufe, III ................ G06F 17/28 704/9 |
| 2015/0370901 | A1 | 12/2015 | Sobeck et al. |
| 2015/0371203 | A1 | 12/2015 | Plunkett et al. |
| 2016/0140439 | A1* | 5/2016 | Adderly .................. G06N 5/02 706/46 |
| 2016/0275147 | A1* | 9/2016 | Morimoto ........... G06F 16/2457 |

OTHER PUBLICATIONS

Socher et al., Deep Learning for Natural Language Processing (without Magic)., 2013, as accessed on Feb. 15, 2018. https://nlp.stanford.edu/courses/NAACL2013/.

Berkely CS 188: Introduction of Artificial Intelligence, as accessed on Feb. 15, 2018.http://inst.eecs.berkeley.edu/~cs188/fall/lectures.html.

Healthcare IT News. © 2017, as accessed on Feb. 15, 2018 http://www.healthcareitnews.com/.

EHR Intelligence. © 2012-2018, as accessed on Feb. 15, 2018 https://ehrintelligence.com/.

Hit Consultant (HealthCare Technology) as accessed on Mar. 7, 2018. http://hitconsultant.net/.

Tu Wien. Vienna University of Technology. (Dissertation "A Comparative Analysis of System Dynamics and Agent-Based Modelling for Health Care Reimbursement Systems", Oct. 2014. English abstract provided.

Capterra. Claims Processing Software as accessed on Feb. 26, 2018 https://www.capterra.com/claims-processing-software/.

Clark, Bloomberg Technology., "I'll be back: The Return of Artificial Intelligence", Feb. 3, 2015.

Iskandarani A novel approach to decision making of Mined Data using Dynamic Snapshot Pattern Recognition Algorithm (DS-PRA). TMLA. vol. 2, Issue 4. Publication date Aug. 3, 2014.

Innography, A CPA Global Company. Advanced Analytics as accessed on Feb. 28, 2018. © 2018 https://www.innography.com/why-innography/advanced-analytics.

Cascini. "Computer-Aided Innovation (CAI)", IFIP 20th World Computer Congress, Proceedings of the 2nd Topical Session of Computer-Aided, Innovation. Sep. 7-10, 2008.

Ye et al., Large Scale Text Analysis, "Electrical Engineering and Computer Sciences University of California at Berkeley". May 15, 2015. Tech Report No. UCB/EECS-2015-136.

Text Comparison Tools for Assisting with Patent Claims Analysis, Patinfomatics, LLC. © 2017 as accessed on Feb. 28, 2018 https://patinformatics.com/text-comparison-tools-for-assisting-with-patent-claims-analysis/.

(56) References Cited

OTHER PUBLICATIONS

Guo et al., "Ranking Structured Documents: A Large Margin Based Approach for Patent Prior Art Search", Department of Computer Science. 2009.
Harris et al., SpringerLink. "Using Classification Code Hierarchies for Patent Prior Art Searches". Abstract only. vol. 29 (2011).
Fu et al., "Design-by-analogy: experimental evaluation of a functional analogy search methodology for concept generation improvement" 2014.
http://www.intellogist.com/wiki/Compare:Patent_Search_System © 2009. Patent Search System.
Amazon Weblink to Costa-Jussa et al., "Hybrid Approaches to Machine Translation" Theory and Applications of Natural Language Processing $1^{st}$ ed. 2016 edition https://www.amazon.com/Approaches-Translation-Applications-Language-Processing/dp/3319213105/ref=sr_1_11?s=books&ie=UTF8&qid=1456415245&sr=1-11&keywords=semantic+information+processing.
Amazon Weblink to Cardoso et al., "Semantic Keyword-based Search on Structured Data Sources: First COST Action IC1302 International KEYSTONE Conference, IKC 2015,Comibra, Portugal" $1^{st}$ ed. 2015 Edition. https://www.amazon.com/Semantic-Keyword-based-Search-Structured-Sources/dp/3319279319/ref=sr_1_62?s=books&ie=UTF8&qid=1456415489&sr=1-62&keywords=semantic+information+processing.
Amazon Weblink to Lakshmi et al., "Computational Intelligence Techniques in Health Care" $1^{st}$ ed. 2016 Edition. https://www.amazon.com/Computational-Intelligence-Techniques-SpringerBriefs-Technology/dp/9811003076/ref=sr_1_8?s=books&ie=UTF8&qid=1456415083&sr=1-8&keywords=semantic+information+processing.
Amazon Weblink to Ionescu et al., "Knowledge Transfer between Computer Vision and Text Mining: Similarity—based learning approaches" (Advances in Computer Vision and Patterson Recogintion). $1^{st}$ ed. 2016 Edition. https://www.amazon.com/Knowledge-Transfer-between-Computer-Vision/dp/3319303651/ref=sr_1_27?s=books&ie=UTF8&qid=1456415406&sr=1-27&keywords=semantic+information+processing.
Amazon Weblink to Supnithi et al., "Semantic Technology: 4th Joint International Conference", $2015^{th}$ Edition (Nov. 9-11, 2014) https://www.amazon.com/Semantic-Technology-International-Conference-Thailand/dp/3319156144/ref=sr_1_2? s=books&ie=UTF8&qid=1456433017&sr=1-2&keywords=Semantic+Technology%3A+Joint+International+Conference%2C+JIST+2015.
Moehrle et al., "Measuring textual patent similarity on the basis of combined concepts: design decisions and their consequences", Abstract. Published online Mar. 13, 2012.
Sweetwiki: A Semantic Wiki Abstract vol. 6, No. 1 (2008) http://www.websemanticsjournal.org/index.php/ps/article/view/138.
Starc et al., "Joint learning of ontology and semantic parser from text", *Jozef Stefan International Postgraduate School, Slovenia*. Nov. 2015.
Collobert et al., "Natural Language Processing (Almost) from Scratch", *Journal of Machine Learning Research* 12 (2011) 2493-2537.
Collobert et al., "A Unified Architecture for Natural Language Processing: Deep Natural Networks with Multitask Learning", NEC Labs America. 2008.
Sheth et al., "Semantic Content Management for Enterprises and the Web" IEEE Internet Computing Jul./Aug. 2002.
Sierra et al., "Machine Learning inspired approaches to combine standard medical measures at an Intensive Care Unit", Dept. of Computer Science and Artificial Intelligence. 1999.
Sierra et al., "Bayesian networks in biomedicine and health-care", *Artificial Intelligence in Medicine* 2004.
Herskovits et al., "Applications of Bayesian Networks to Health Care", Technical Report NSI-TR-1997-02. Mar. 27, 1997.
Wang et al.,"$R^3$ Reinforced Ranker-Reader for Open-Domain Question Answering", School of Information System, Singapore Management University, Nov. 21, 2017.
"Google open-sources natural language understanding tools", http://www.kurzweilai.net/google-open-sources-natural-language-understanding-tools?utm_source=KurzweilAI+Daily+Newsletter&utm_campaign=018a562279-UA-946742-1&utm_medium=email&utm_term=0_6de721fb33-018a562279-282137525 May 11, 2016.
How Google Plans to Solve Artificial Intelligence. MIT Technology Review ©2018, as accessed on Feb. 13, 2018 https://www.technologyreview.com/s/601139/how-google-plans-to-solve-artificial-intelligence/#/set/id/601159/.
Teach Yourself Deep Learning with TensorFlow and Udacity. Google Research Blog. Jan. 21, 2016. Vanhoucke, Vincent https://research.googleblog.com/2016/01/teach-yourself-deep-learning-with.html.
Now AI Machines Are Learning to Understand Stories. MIT Technology Review. © 2018, as accessed on Feb. 13, 2018.
Colucci et al., "Concept abduction and contraction for semantic-based discovery of matches and negotiation spaces in an e-marketplace", Semantic Scholar. (2004) https://www.semanticscholar.org/search?q=semantic%20searching%20of%020e-discovery&sort=relevance.
How Meta's Literature Discovery Engine Works. © 2018, as accessed on Feb. 13, 2018. https://vimeo.com/144358069.
Lawmoose, Lawsaurus and Laugment, *What Comes After the Search Engine? Semantic Network-Based Lawyer Augmentation*, Jun. 25, 2015.
Kurzweil Accelerating Intelligence, *The Top A.I. Breakthroughs of 2015*, available at http://www.kurzweilai.net/the-top-ai-breakthroughs-of-2015?utm_source=KurzweilAI+Daily+Newsletter&utm_campaign=1057a4f9d8-UA-946742-1&utm_medium=email&utm_term=0_6de721fb33-1057a4f9d8-282137525, Dec. 29, 2015.

* cited by examiner

Please select one of the following cognitive features:

| Identify Cogent Information | Answer a question | Identify Concepts | Cognitive comparison | Identify Entities | Identify Patterns |

Cogent Information Identification

This tool identifies the cogent and useful information extracted from the selected files on the left side,
Select one or more files then Click the "identify Cogent Information" button to identify cogent information from each of the selected files

[ Identify Cogent Information ]

| File | Cogent Information found in the file |
|---|---|
| c5.txt | Massively parallel DNA and RNA sequencing approaches have generated data on thousands of breast cancer genomes in breast cancer, there is a dramatic difference in the SMG list between luminal-type breast cancer and basal-like breast cancer in The Cancer Genome Atlas (TCGA) breast cancer data, at least 20 SMGs were observed in luminal-type A, eight in luminal-type B, but only three in basal-like breast cancer This is not because luminal breast cancer genomes are more complex than those of basal-like breast cancer; in fact, the opposite is true The genomic structure of breast cancer reveals underlying DNA repair defects Aside from the focus on the identification of individual genes that are repetitively disrupted in breast cancer, a more broad-based analysis of breast cancer genome structures has led to a paradigm shift in the way we view pathogenesis The reported frequency of chromothripsis in breast cancer varies from 2% to 11.06% Differences in DNA repair defects explain the striking finding that some breast cancers display many more mutations than others |

Please select one of the following cognitive features:

Identify Cogent Information | Identify Concepts | Cognitive comparison | Identify Entities | Identify Patterns
--- | --- | --- | --- | ---
 | | Answer a question | |

Question Answering

This tool answers a question that you ask by reading the files you select and determining the answer to your question. Select one or more files from the left side menu and type a question then click the "Answer Question" button to find the answers from the selected files What did Peskov tell the CNN?

[ Answer Question ]

| File | Answer |
| --- | --- |
| c1.txt | Kremlin spokesman Dmitry Peskov told CNN that Putin "was informed of this request" but gave no word on whether it would be accepted. |

Identify Cogent Information    Answer a question    | Identify Concepts |    Cognitive comparison    Identify Entities    Identify Patterns

Concepts Identification

This tool identifies the concepts found in the selected documents, select one or more files from the left side and then click the "Identify Concepts" button to identify the concepts found in the selected files

| Identify Concepts |

| Identified Concept | Indentified in File |
|---|---|
| the shooting down of a Russian warplane | c1.txt |
| Turkish Prime Minister Ahmet Davutoglu, often characterized as the friendly face of his government. | c1.txt |
| the shooting down by Turkish this week | c1.txt |
| NATO's role in conflict between Turkey and Russia | c1.txt |
| role in conflict between Turkey and Russia | c1.txt |

Please select one of the following cognitive features:

Identify Cogent Information    Answer a question    Identify Concepts    [Cognitive comparison]    Identify Entities    Identify Patterns

Cognitive Comparison Engine

This tool compares the cogent information between the selected documents/files and then provides a summary of the differences between the documents. This tool works by understanding the information in the documents and therefore only provides the real differences between the Related Documents.
Click the "Compare" button to compare the selected files against each other

[Compare]

| Cogent information in File: c15.txt | Cogent information in File: c30.txt | Differences Found among the files |
|---|---|---|
| The symptoms were of grave concern, as the patient had previously undergone surgery for breast cancer that had spread to her brain If such a cancer returns post-surgery, that is often a sign the patient doesn't have much time left An MRI confirmed that the breast cancer had again spread to the woman's cerebrospinal fluid The cancer cells in the fluid also had a lot of HER2, a protein associated with aggressive breast cancers but also treatable with a drug called Herceptin (trastuzumab) Or they can be copied to many times the good news is that breast cancer is one of the forms of cancer that has had a personalized approach for the longest time In 1951, researchers discovered that the hormone estrogen could drive the growth of breast cancer That's one way of understanding how our vision of breast | Examples are emerging, however, including targeting HER2 is HER2 mutant breast cancer and mutant ESR1 in ESR1 endocrine refractory luminal-type breast cancer There is a growing chasm between our understanding of the breast cancer genome and our ability to translate these insights into improved patient outcomes in breast cancer, there is a dramatic difference in the SMG list between luminal-type breast cancer and basal-like breast cancer and basal-like breast cancer in The Cancer Genome Atlas (TCGA) breast cancer data, at least 20 SMGs were observed in luminal-type A, eight in luminal-type B, but only three in basal-like breast cancer (Table 1) This is not because luminal breast cancer genomes are more complex than those of basal-like breast cancer; in fact, the opposite is true The genomic structure of breast cancer reveals | Examples are emerging, however, including targeting HER2 in HER2 mutant breast cancer and mutant ESR1 in ESR1 endocrine refractory luminal-type breast cancer. There is a growing chasm between our understanding of the breast cancer genome and our ability to translate these insights into improved patient outcomes. In breast cancer, there is a dramatic difference in the SMG list between luminal-type breast cancer and basal-like breast cancer. In The Cancer Genome Atlas (TCGA) breast cancer data, at least 20 SMGs were observed in luminal-type A eight in luminal-type B, but only three basal-like breast cancer (Table 1). this is not because luminal breast cancer genomes are |

Please select one of the following cognitive features:

Identify Cogent Information | Answer a question | Identify Concepts | Cognitive comparison | [Identify Entities] | Identify Patterns

Entity and Relations Identification

This tool identifies the entities (objects) that are found in the selected files and then identifies the relations within these objects. Choose one or more files then click the "Identify Entities" button to identify the entities and their relations from the selected files

[Identify Entities]

| Entity | Class | Information |
|---|---|---|
| MD Anderson Cancer Center | ORGANIZATION | Found in file: c15.txt<br>• Monica Loghin ==> neuro-oncologist at ==> MD Anderson Cancer Center--> PERSON ==> neuro-oncologist at ==> ORGANIZATION<br>• MD Anderson Cancer Center ==> is in ==> Houston --> ORGANIZATION ==> be in ==> LOCATION |
| Houston | LOCATION | Found in file: c15.txt<br>• MD Anderson Cancer Center ==> is in ==> Houston --> ORGANIZATION ==> be in ==> LOCATION |
| Monica Loghin | PERSON | Found in file: c15.txt<br>• Monica Loghin ==> neuro-oncologist at ==> MD Anderson Cancer Center--> PERSON ==> neuro-oncologist at ==> ORGANIZATION |
| difficulty | GENERAL | Found in file: c15.txt<br>• difficulty ==> controlling ==> her bladder --> GENERAL ==> control ==> GENERAL |
| her bladder | GENERAL | Found in file: c15.txt<br>• difficulty ==> controlling ==> her bladder --> GENERAL ==> control ==> GENERAL |
| that | REFERENCE | Found in file: c15.txt<br>• that ==> had spread to ==> her brain --> REFERENCE ==> have spread to ==> GENERAL |

Please select one of the following cognitive features:

Identify Cogent Information  Answer a question  Identify Concepts  Cognitive comparison  Identify Entities  Identify Patterns Pattern Relations Identification [BASIC]

This tool identifies the entities (objects) along with their relations and then identifies the change between the relations within the objects (entities). Choose one or more files then click the "Identify Patterns" button to identify the patterns between the entities in the selected files.

Anderson Cancer

Houston

Identify Patterns

| Entity | Class | Information |
|---|---|---|
| Houston | LOCATION | Found in file: c15.txt<br>• MD Anderson Cancer Center ==> is in ==> Houston --> ORGANIZATION ==> be in ==> LOCATION |

FIG. 13F

SYSTEMS AND METHODS FOR IDENTIFYING EVIDENTIARY INFORMATION

RELATED APPLICATION

The present application claims the benefit of U.S. Provisional Application No. 62/323,118, filed Apr. 15, 2016, which is fully incorporated herein in its entirety by reference. This application is also related to co-pending application Ser. No. 14/756,120, filed Aug. 3, 2015, entitled, "Systems and Methods for Semantic Understanding of Digital Information," which is also fully incorporated herein in its entirety by reference.

TECHNICAL FIELD

Embodiments relate generally to digital information, and more particularly, to systems and methods for semantically analyzing digital information.

BACKGROUND

Historically, in order to understand or appreciate a particular topic, one would need to read a myriad of resources and manually synthesize the contents of the resources. Conclusions or theories or broadly-categorized "results" could then be made based on this synthesis. This, of course, is a time-intensive and user-specific process.

However, as digital information becomes more and more prevalent and an increasing number of resources become available in a digital format in online databases, there is an opportunity to automate the reading and understanding of resources in order to derive useful knowledge across a wide variety of topics and for any generic user.

For example, the article *Joint Learning of Ontology and Semantic Parser from Text* by Starc and Mladenic from Jozef Stefan International Postgraduate School and published November 2015, describes a semantic parsing approach to analysis of digital content. However, this approach uses an ontology direction, which is the basis of supervised learning. The ontology defines the pathways or steps for reading the content. However, this approach requires supervisor intervention for the ontology direction.

In another example, the article *Natural Language Processing (Almost) from Scratch* by Collobert et al. from *Journal of Machine Learning Research* and published August 2011, describes an approach that utilizes neural networks based on supervised learning and requires a prior data set with predefined results for semantic understanding.

In another example, the article *A Unified Architecture for Natural Language Processing: Deep Neural Networks with Multitask Learning* by Collobert and Weston of NEC Labs America, describes an approach that also utilizes neural networks based on supervised learning.

Therefore, there is a need for systems and methods that provide for real-time, accurate, and verifiable identification and analysis of digital content that is more sophisticated than a basic key word analysis and which requires less supervision than existing systems.

SUMMARY

Embodiments comprise a plurality of engines configured to interface to each other to provide a comprehensive analysis and computerized "understanding" of digital content. Embodiments can output confident (i.e. provable results for particular elements) such as answers to specific questions or the identification of differences between related documents. Embodiments are further configured to further provide a timeline of time-based relation or entity search to identify particular events that occurred within the scope of a particular element or its relations. Systems allow the ability to identify or understand the context of elements in relation to a uniform time and date.

In an embodiment, a system for analyzing digital content available via a networked resource comprises a cognitive engine including a processor and an operably coupled memory, the memory comprising instructions that, when executed, causes the processor to implement: a pre-reading of the digital content to determine a size of the digital content, a number of documents in the digital content, and an amount of processing needed to analyze the digital content; a loading of a plurality of cognitive engine instances based on at least one of the size of the digital content, the number of documents in the digital content, and the amount of processing needed to analyze the digital content; a cogent information engine configured to: parse a document from the digital content, identify a part of speech for every word in the document, identify a subject word for all reference words in the document, generate a parsing tree for the document to determine a sentence structure for every sentence in the document based on the parts of speech and the subject words, determine a sentence meaning for every sentence in the document based on the sentence structure and a plurality of grammatical tests, determine a weighting for each sentence wherein sentences having similar sentence meanings have similar weightings; and output a subset of the sentences based on the weighting as cogent information of the document; a concept extraction engine configured to determine noun phrases in the cogent information based on the part of speech identification, wherein each noun phrase is a digital content concept; an entity extraction engine configured to: identify a plurality of entities for each of the identified digital content concepts and one or more relations between the plurality of entities based on the part of speech identification, and classify the plurality of entities; and a pattern recognition engine configured to determine a difference in relations between entities of the identified digital content concepts, generate an output of the differences relative to a time marker, and provide a conclusory action for the digital content.

In an embodiment, a method for analyzing digital content available via a networked resource with a cognitive engine including a processor and an operably coupled memory comprises pre-reading the digital content with the processor to determine a size of the digital content, a number of documents in the digital content, and an amount of processing needed to analyze the digital content; loading of a plurality of cognitive engine instances based on at least one of the size of the digital content, the number of documents in the digital content, and the amount of processing needed to analyze the digital content; reading, with the processor, a document from the digital content; identifying, with the processor, a part of speech for every word in the document; identifying, with the processor, a subject word for all reference words in the document; generating, with the processor, a parsing tree for the document to determine a sentence structure for every sentence in the document based on the parts of speech and the subject words; determining, with the processor, a sentence meaning for every sentence in the document based on the sentence structure and a plurality of grammatical tests; determining, with the processor, a weighting for each sentence, wherein sentences having similar sentence meanings have similar weightings; outputting, with the processor, a subset of the sentences based on the weighting as cogent information of the document; determining, with the processor, noun phrases in the cogent information based on the part of speech identification, wherein each noun phrase is a digital content concept; identifying, with the processor, a plurality of entities for each of the identified digital content concepts and one or more relations between the plurality of entities based on the part of speech identification; classifying, with the processor, the plurality of entities; determining, with the processor, a difference in relations between entities; generating, with the processor, an output of differences relative to a time marker; and provide, with the processor, a conclusory action for the digital content.

In an embodiment, a method for associating timestamp data for a plurality of digital content objects and digital content relations linking the digital content objects with a cogent information engine including a processor and an operably coupled memory comprises identifying, with the processor, at least one digital content file timestamp, the file timestamp having a file timestamp format; identifying, with the processor, at least one date-time object within the digital content; converting, with the processor, the at least one date-time object into the file timestamp format; correlating, with the processor, the at least one digital content file timestamp with the at least one date-time object; associating, with the processor, a time-based index for each of the plurality of digital content objects and digital content relations; and outputting, with the processor, the time-based index for at least one of the plurality of digital content objects or digital content relations.

In an embodiment, a plurality of algorithms implemented by respective engines are configured to implement the intelligent and self-learning contextual understanding of digital content. Embodiments of algorithms are further configured for lexical analysis, word trimming, part-of-speech (POS) tagging, textual inference generation, and parsing trees implementation to allow for the identification of a type of the word or phrase to identify entities or objects and respective relations.

Embodiments described herein include a cognitive engine configured for multi-step, multi-feature processing that has many advantages in determining useful evidentiary information from large data sets. Further, the cognitive engine can analyze or manipulate the evidentiary information to derive data needed to solve problems, identify issues, and identify patterns. The results can then be applied to any application, interface, or automation as appropriate.

In a feature and advantage of embodiments, a cognitive engine is configured to classify an input text (or digital material). For example, a classification can be determined from an entire domain chain, which can vary from global to specific. In embodiments, a classification can comprise any level of specificity for the digital material context or application.

In another feature and advantage of embodiments, the cognitive engine is configured to determine a classification of objects/entities based on an object or entity type, such as date, time, person, organization, etc.

In another feature and advantage of embodiments, the cognitive engine is configured to determine or extract concepts found in the digital material. Concepts can include larger or aggregated theories, models, hypothesis, ideas, and so on.

In another feature and advantage of embodiments, the cognitive engine is configured to determine or extract objects (or entities) found in the digital material.

In another feature and advantage of embodiments, the cognitive engine is configured to determine one or more relations between objects and object types. As will be readily understood by one skilled in the art, objects and object types can have any number of relations, including parent-child, one-to-one, one-to-many, many-to-one, and so on.

In another feature and advantage of embodiments, the cognitive engine is configured to apply determinations within the context of a date/time factor. For example, a date/time factor can include a $4^{th}$ dimension consideration that includes a relative timeline listing the actions or events that correspond with an entity. In embodiments, a $4^{th}$ dimension consideration can be saved or contextualized in any appropriate data structure.

In another feature and advantage of embodiments, the cognitive engine is configured to determine an inference. For example, an inference can include how a body of matter is related within a context.

In another feature and advantage of embodiments, the cognitive engine is configured to make useful, applicable, and pragmatic analyses from the knowledge obtained. In embodiments, the cognitive engine can further make intuitive computerized validated predictions from the knowledge obtained.

In another feature and advantage of embodiments, the cognitive engine is configured to extract one or more answers for a question related to the digital material. In other embodiments, a plurality of questions can be "asked." In such embodiments, one or more answers can be extracted for each of the plurality of questions. In another example, the cognitive engine is configured to provide or output cogent or useful information from the complied, aggregated, or otherwise analyzed data.

In another feature and advantage of embodiments, the cognitive engine is configured to categorize graphic files or images. In embodiments, graphic files or images can be categorized according to discrete classifications that relate to images or graphics. In other embodiments, graphic files or images can be categorized according to the text-based classifications.

In another feature and advantage of embodiments, the cognitive engine is configured to analyze and "understand" graphical information of images or graphics based on a category or classification. Further, the cognitive engine can output data from the images or graphics or otherwise interpreting the images or graphics.

In another feature and advantage of embodiments, the cognitive engine is configured to query or search multiple online databases or websites for content related to a null hypothesis model.

In another feature and advantage of embodiments, the cognitive engine is configured to conclude an action or cascade of actions based on information in the dataset.

In another feature and advantage of embodiments, the cognitive engine is configured to automatically self-learn and self-evolve. For example, a rule-based analysis can be iterated or evolved based on results of a previous output or an analysis of information found in the digital material.

In another feature and advantage of embodiments, the cognitive engine is configured to use as inputs into a second sub-engine the outputs or results from a first sub-engine. Accordingly, results can be pre-processing to be used and re-used in other sub-engines, which optimizes the processing power and time that is needed by the cognitive engine system. For example, reusable results can include cogent information extracted, concepts extracted, entities/objects extracted, or entity relations extracted.

Accordingly, a cognitive engine comprises engines or sub-engines implementing specialized functions integrated into hardware that can interface with digital content, analyze the digital content, and output results related to the digital content. The cognitive engine can implement functions to classify an input text or digital content. The cognitive engine can further extract concepts found in the text. The cognitive engine can further extract objects (entities) from the text. The cognitive engine can further identify a type (class) of extracted objects. The cognitive engine can further extract relations (actions) between entities. The cognitive engine can further extract one or more interactions between the relations and their respective entities within a date/time context. The cognitive engine can further rank concepts to find a most apparent (weighted) concept, which can be equated to the "topic" of the text. The cognitive engine can further rank objects to find a most apparent (weighted) object or entity, which can be equated to the "core" of the text. The cognitive engine can further determine any sub-entities or sub-relations corresponding to the core entity or object. The cognitive engine can further determine any logical interaction between objects, including providing a date/time element as an indexing factor to associate the events or relations. The cognitive engine can further identify any patterns within the entities or objects and their relations, including determining any differences or variances between the relations. In embodiments, particular citations or references to the digital content can be provided. The cognitive engine can further utilize a multi-server clustering model with a preprocessing algorithm to balance the processing load among multiple clusters of servers. For example, each cluster can be for a set number of servers. The cognitive engine can further identify binary data contained in the dataset including imaging information, such as graphics and graphs. The cognitive engine can further classify image data. For example, classifications can include a graph (pie, column, bar, etc.) a photo, a device scan (CT scan, X-ray, etc.), and can be determined based at least on the content of the image file. The cognitive engine can further interface to one or more databases or websites to query for related information and obtain the null hypothesis, if available. For example, a concept search feature and/or meaning search feature can be utilized for such queries. The cognitive engine can further output conclusory actions or cascades of actions based on pattern recognition and entity-relation information found in the digital content. The cognitive engine can further learn, adapt and evolve based on the information found in the data set. In embodiments, such learning can be done automatically or without additional user input or command. As a consequence of the systems and methods described herein, a confidence level to have less supervision, or in some cases, no supervision, of the digital content learning can be achieved.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

FIG. 13A is a screenshot of a cogent information identification interface, according to an embodiment.

FIG. 13B is a screenshot of a question-asking and question-answering interface, according to an embodiment.

FIG. 13C is a screenshot is a concept identification interface, according to an embodiment.

FIG. 13D is a screenshot of a cognitive comparison engine interface, according to an embodiment.

FIG. 13E is a screenshot of an entity and relation identification interface, according to an embodiment.

FIG. 13F is a screenshot of a pattern identification interface, according to an embodiment.

Figure 1:
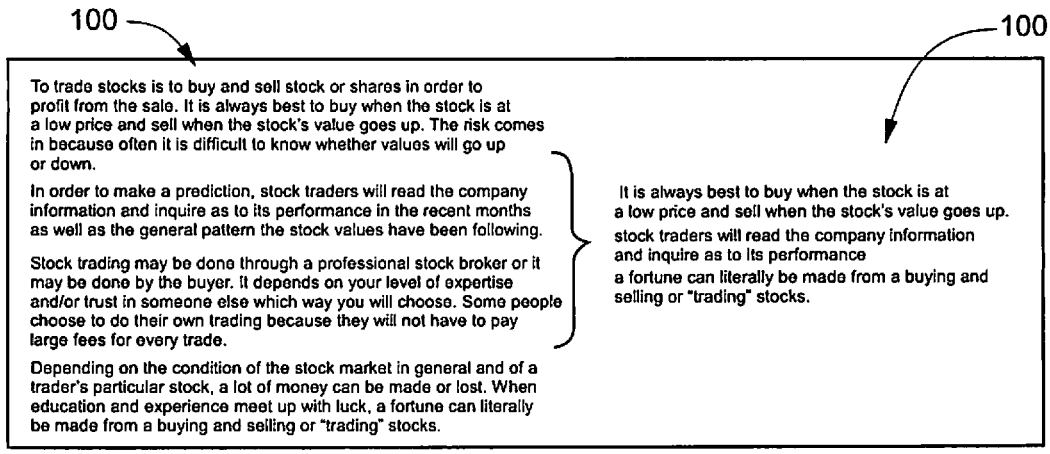
FIG. 1 is an example of digital material input text and a corresponding output from a system for analyzing digital content, according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Referring to FIG. 1, an example of digital material input text 100 and a corresponding output 102 from a system for analyzing digital content is depicted, according to an embodiment. Though simplistic, FIG. 1 provides an example of the functionality of embodiments described herein. One skilled in the art will readily appreciate that the concepts described herein can be readily scaled to any suitable digital content. As depicted, input text 100 includes key objects, topics, relations, as well as additional information that can be supplemental or superfluous to the primary meaning or emphasis of the text 100. Systems described herein are configured to distill the primary argument or meaning from input text 100 and output a result, shown here as output 102.

Figure 2:
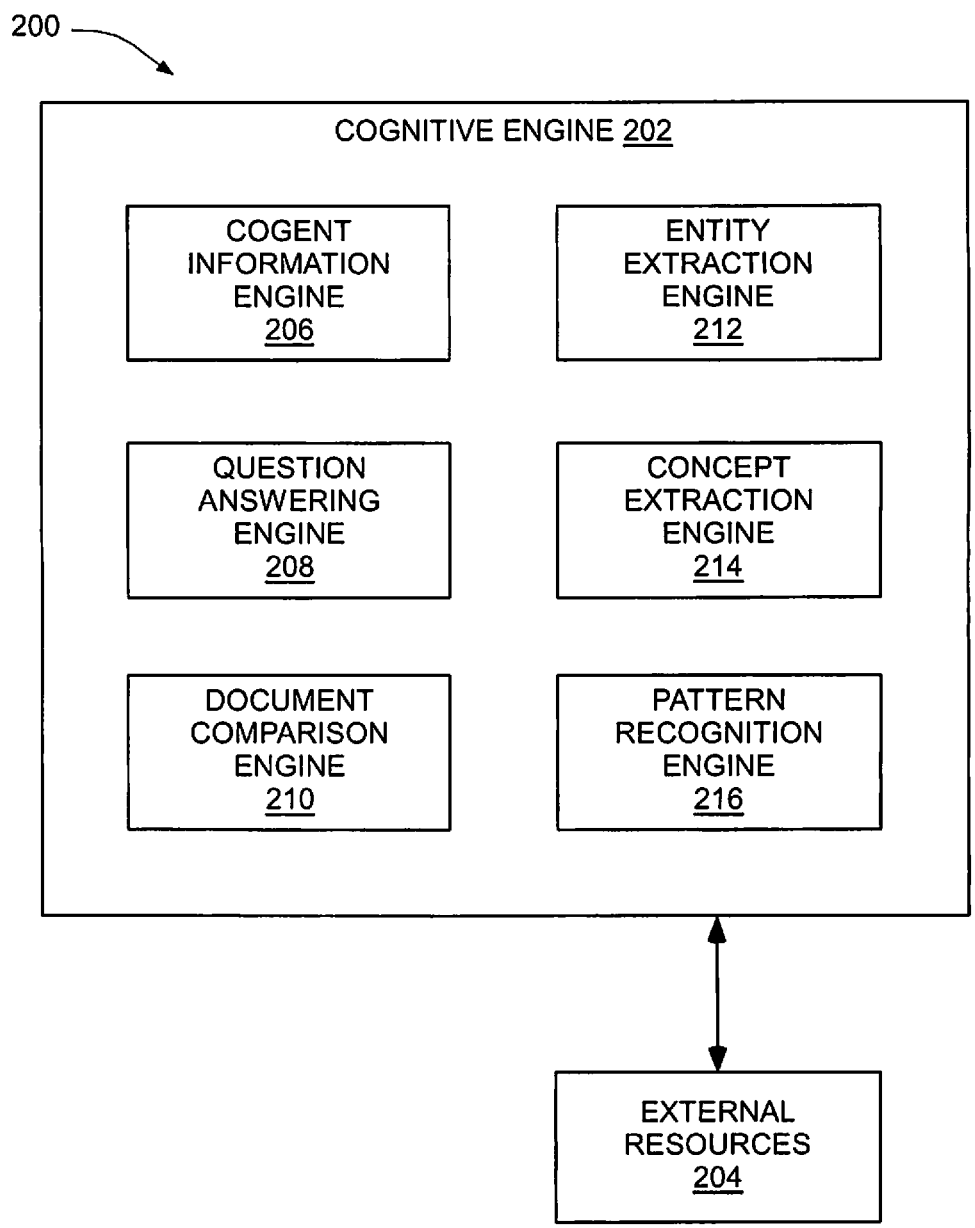
FIG. 2 is a block diagram of a system for analyzing digital content, according to an embodiment.

Referring to FIG. 2, a block diagram of a system 200 for analyzing digital content is depicted, according to an embodiment. System 200 generally comprises a cognitive engine 202 and one or more external resources 204.

In an embodiment, cognitive engine 202 comprises a set of sub-engines configured to interface to digital content to achieve computerized understanding of the digital content. Subsequently, useful information related to the digital content can be output according to the application of cognitive engine 202. In an embodiment, cognitive engine 202 generally comprises cogent information engine 206, question answering engine 208, document comparison engine 210, entity extraction engine 212, concept extraction engine 214, and pattern recognition engine 216.

The engines described herein can be constructed, programmed, configured, or otherwise adapted, to autonomously carry out a function or set of functions. The term engine as used throughout this document is defined as a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that cause the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboards, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically embodied configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly in parallel or series with, and/or complementary to other functions, or distributed differently among a set of engines than specifically illustrated in the examples herein.

Cogent information engine 206 is configured to identify the cogent information contained in a document from a dataset (digital content). "Cogent information" can include useful or important information contained within the digital text or digital graphic content. In an embodiment, cogent information engine 206 utilizes multiple algorithms to obtain the cogent or important information from the document or dataset by utilizing a POS algorithm to classify the words in the sentences. Cogent information engine 206 further utilizes a parsing tree to find the closest sentence structure and to determine the complete sentence meaning. An inference process further identifies those sentences that have the most complete meanings by a relative weighting. For example, duplicative or redundant sentences can be "skimmed" in favor of those sentences that have the most complete meanings relative to the document context. In an embodiment, an inference sub-engine is thereby configured to identify sentences that are related to the context of the document.

Question answering engine 208 is configured to answer a particular question in natural language based on information that is provided in the dataset. In an embodiment, question answering engine 208 can be used to "ask" a question in natural language. The concepts found in the question can be extracted and then matched with concepts found in the document(s) from the dataset. Subsequently, an inference between the sentence(s) containing the concepts found in both the question and the document(s) can be identified in order to provide an "answer" for that question. In embodiments, specific line number in one or more documents can be referenced as evidence of the answer or a line of logic to the answer.

Document comparison engine 210 is configured to identify differences between similar documents in the dataset. In an embodiment, document comparison engine 210 utilizes the cogent information found in documents of the dataset to conduct a document similarity analysis. Document comparison engine 210 is configured to identify related information in the documents, then to identify differences between concepts and entities found in the documents. In an embodiment, document comparison engine 210 can exclude unrelated or irrelevant information by identifying differences between related documents. As a result, if the information being compared is not related or irrelevant, document comparison engine 210 is configured to exclude it from the comparison.

Entity extraction engine 212 is configured to identify entities (objects) in the dataset documents, along with relations (actions) between the entities. In an embodiment, entity extraction engine 212 is further configured to identify the entities contained in each document in the dataset and the relations between the entities, as well as a date/time marker or timestamp, as will be explained further below.

Concept extraction engine 214 is configured to identify concepts in the documents of the dataset. In embodiments, the concepts identified by concept extraction engine 214 are utilized by other sub-engines of cognitive engine 202 as described herein.

Pattern recognition engine 216 is configured to determine differences or changes in relations between entities. Pattern recognition engine 216 is further configured to determine any differences in relations between entities in a timeline fashion between a single and multiple document(s) in the dataset. In an embodiment, pattern recognition engine can compare relations found between entities and their respective relations from the various documents in the dataset to identify any changes or differences between relations on three levels. In an embodiment, changes in the relations between the same entities can be identified. In an embodiment, changes in the entities between the same relations can be identified. In an embodiment, changes in the entities or classes of the entities with differences in the relations can be identified. Pattern recognition engine 216 is further configured to identify differences with respect to a timeline (date/time) of the relation in the context of when a difference "happened" to give a complete timeline of the changes in the patterns.

External resources 204 can include any database, set of databases, website, data set, or any other suitable data source including or containing data relevant to cognitive engine 202 processing. For example, external resources 204 can include WIKIPEDIA databases for contextual reference to the input text by any of the sub-engines of cognitive engine 202.

Therefore, in embodiments, a confidence level of system 200 affording less supervision, or in some cases, no supervision, in analyzing the digital content is achieved.

Figure 3:
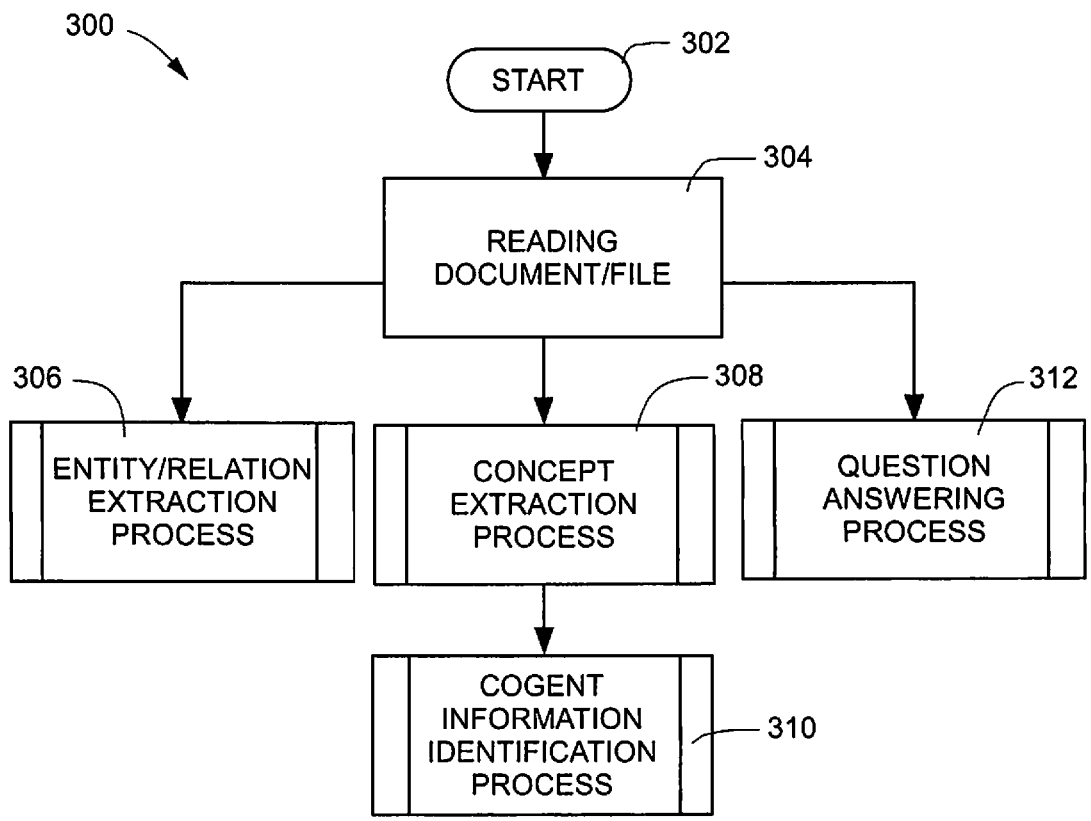
FIG. 3 is a flowchart of a method for cognitive engine processing of digital content, according to an embodiment.

Referring to FIG. 3, a flowchart of a method 300 for cognitive engine processing of digital content is depicted, according to an embodiment. In an embodiment, method 300 can be implemented by, for example, system 200. Method 300, by processing of sub-engines of system 200 thereby determines the meaning, concepts, and a subsequent understanding for a data set.

Method 300 begins at start 302. In an embodiment, the method can start 302 by a function call, user operation, or any other appropriate initialization. At 304, the dataset is "read" by system 200. In embodiments, the dataset is "read" by documents, files, and other digital content being input or otherwise interfaced to system 200. At 306, entities and relations are extracted from the digital content according to an entity/relation extraction process. At 308, concepts are extracted from the digital content according to a concept extraction process. At 310, cogent information is identified according to a cogent information identification process. At 312, one or more questions about the digital content can be answered according to a question answering process 312.

Lingual parsing trees can be utilized to read the data set or digital content and determine concepts, entities, and relations within the digital content. In an embodiment, parsing tree creation comprises a lexical process that iterates through the words in a sentence, classifies those words (within the scope of the parts of speech, such as noun, verb, etc.), then uses the classification to identify the sentence structure and therefore identify what type of the sentence is at issue.

In an embodiment, cognitive engine processing is based on general grammar directives to identify the structure of the sentence. For example, method 300 can utilize the information obtained from POS tagging to generate or revise a structure of the sentence based on grammar rules, taking into consideration the difference between the sentence types (e.g. simple, compound, complex) and the nature of the sentence (e.g. noun phrase, verb phrase, etc.). In an embodiment, the arrangements of the word classes obtained by the POS tagging can also be utilized.

In general, an analysis includes analyzing digital content to determine sentences providing meaning, identifying concepts found in each meaningful sentence, identifying objects or entities contained in the meaningful sentence, identifying a classification for each of the objects/entities, and identifying any relations between the objects/entities and relating any actions, relations, or events to classes of the objects. Each of the aforementioned analysis steps will now be discussed in further detail.

Initially, complete sentences within groups of text can be determined for the digital content. In other words, sentences that provide complete meaning can be identified. For example, referring to FIG. 4, a flowchart of a method 400 for meaningful sentence identification is depicted, according to an embodiment. At 402, the "reading" of the digital content begins. At 404, every word in every sentence is analyzed for a POS classification. At 406, the structure of each sentence is determined according to at least its word classification. At 408, sentences that meet the complete meaning structure can be identified. Various criteria or indicators that indicate a "complete meaning" sentence can be utilized. For example, a "complete meaning" sentence is a grammatical expression that identifies a sentence to have a complete or full meaning if it contains a main clause with an independent subject and verb which expresses a complete thought.

Figure 4:
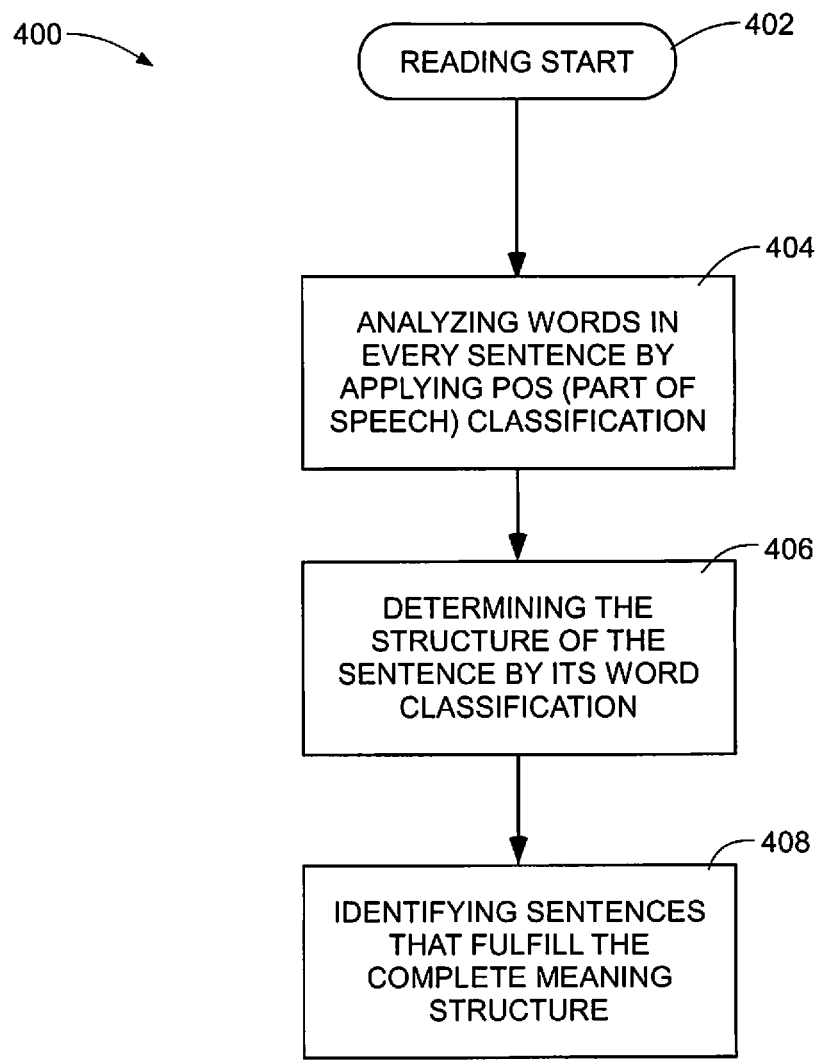
FIG. 4 is a flowchart of a method for meaningful sentence identification, according to an embodiment.
Figure 5A:
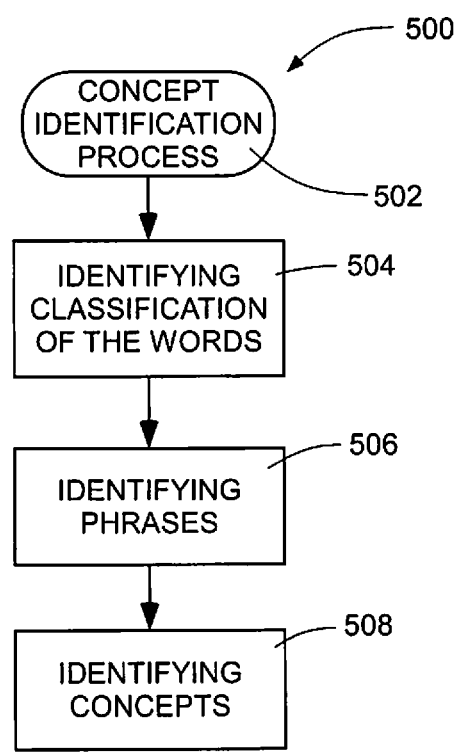
FIG. 5A is a flowchart of a method for concept identification for meaningful sentences, according to an embodiment.
Figure 5B:
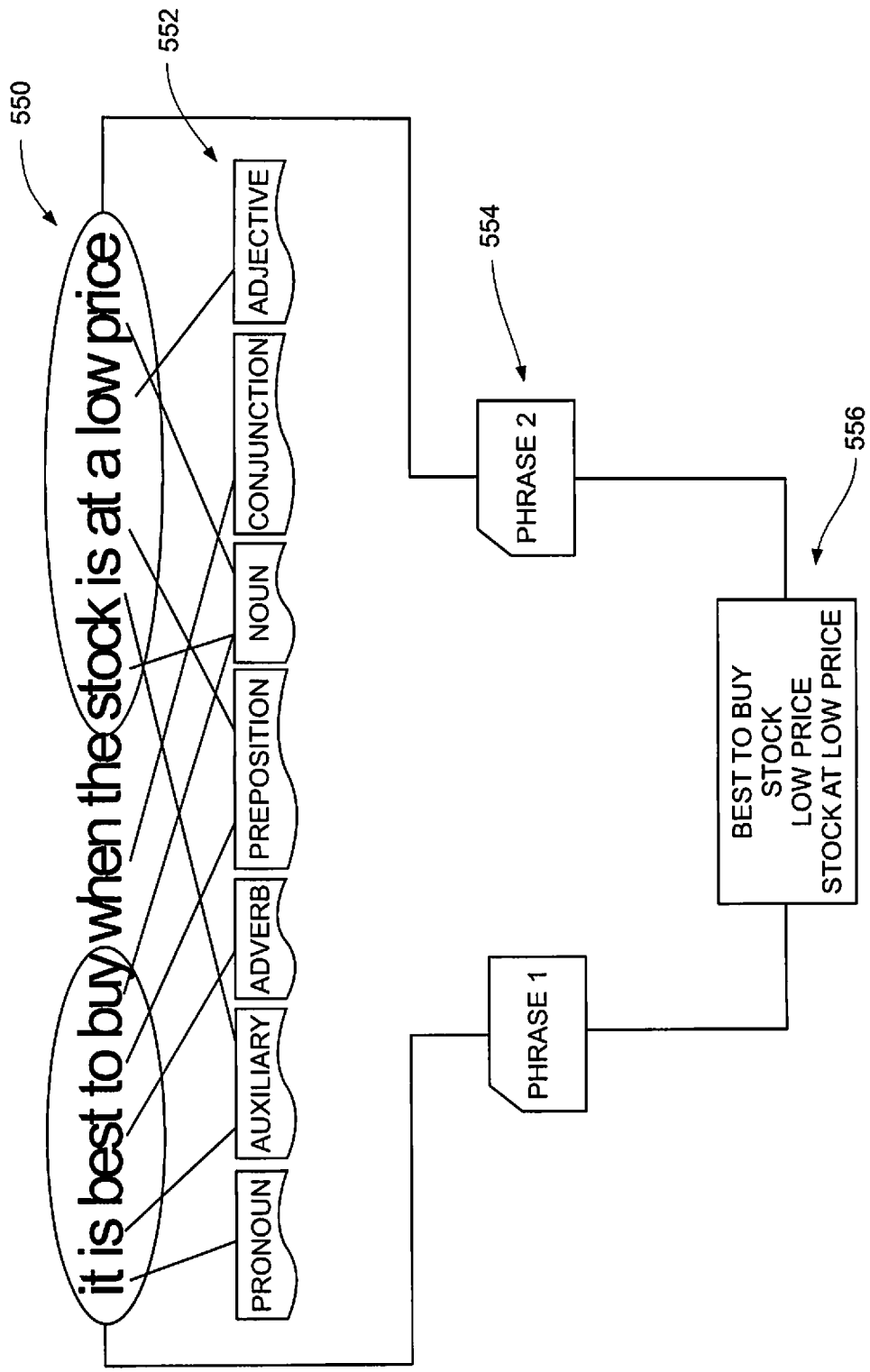
FIG. 5B is a block diagram of a sentence and its components as identified by the method of FIG. 5A.

Next, concepts can be found in each "meaningful" sentence or sentence having a "complete meaning." For example, referring to FIG. 5A, a flowchart of a method 500 for concept identification for the meaningful sentences identified in FIG. 4 is depicted, according to an embodiment. FIG. 5B is a block diagram of a sentence and its components as identified by the method of FIG. 5A.

At 502, the concept identification process begins. In an embodiment, the method can begin 502 by a function call, user operation, or any other appropriate initialization.

At 504, words of a sentence are identified according to at least one classification. For example, referring to FIG. 5B, the words of sentence 550 are classified into one of classifiers 552. Sentence 550 reads, "It is best to buy when the stock is at a low price." Classifiers 552 include pronoun, auxiliary, adverb, preposition, noun, conjunction, and adjective. In other embodiments, other classifiers 552 can be utilized.

Returning again to FIG. 5A, at 506, phrases of the sentence are identified. For example, in FIG. 5B, the phrases 554 of sentence 550 are identified as Phrase 1 and Phrase 2.

Returning again to FIG. 5A, at 508, concepts of the sentence are identified. For example, in FIG. 5B, concepts 556 of sentence 550 are identified as "best to buy," "stock," "low price," and "stock is at low price."

Figures 6A, 6B:
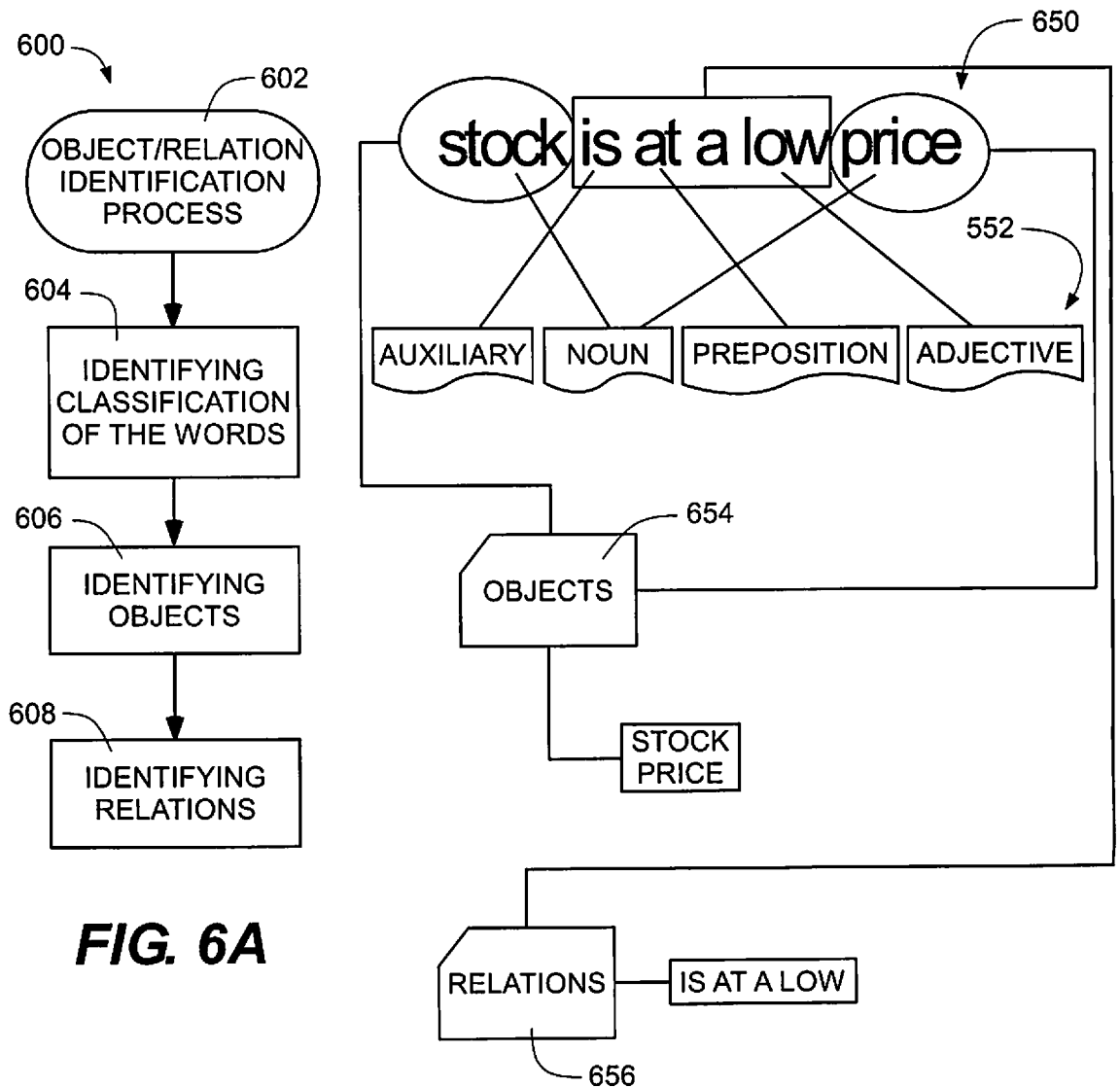
FIG. 6A is a flowchart of a method for object/entity identification for the concepts identified in FIG. 5A, according to an embodiment.
FIG. 6B is a block diagram of a concept and its components as identified by the method of FIG. 5A.

Next, objects or entities can be identified for every meaningful sentence, based at least on the concepts identified by method 500. For example, referring to FIG. 6A, a flowchart of a method 600 for object/entity identification for the concepts identified in FIG. 5A is depicted, according to an embodiment. FIG. 6B is a block diagram of a concept and its components as identified by the method of FIG. 5A.

At 602, the object/relation identification process begins. In an embodiment, the method can begin 602 by a function call, user operation, or any other appropriate initialization.

At 604, the words of the concept are identified according to at least one classification. In an embodiment, the previous classification from sentence identification classification can be utilized. In other embodiments, additional or supplemental classifications can be made. For example, referring to FIG. 6B, the words of concept 650 are classified into one of classifiers 652. Classifiers 652 include auxiliary, noun, preposition, and adjective. In other embodiments, other classifiers 652 can be utilized.

At 606, the objects of the concept are identified. For example, referring again to FIG. 6B, the objects 654 of concept 650 are "stock" and "price." In an embodiment, the objects are nouns, but can include other classifications as well.

At 608, the relations between the objects identified in 606 are identified. For example, the relation 656 between objects 654 "stock" and "price" is "is at a low." In an embodiment, the relation includes a verb, preposition, and adjective, but can include other classifications as well, depending on the objects identified.

Next, a classification for each of the objects/entities is made, such as "person," "location," "date/time," etc. In an embodiment, one or more knowledge bases, such as external resources 204 can be utilized to classify each of the objects or entities. An initial step identifies a grammatical type of the word, such as verb, noun, adjective, etc. A subsequent step identifies the nature of the word. For example, the word can be initially identified as a noun and subsequently identified to have a "date" nature (i.e. be in a date category). The one or more knowledge bases can be searched or indexed for these identifications. In embodiments, for date category words, corresponding date/timestamp for those words can also be obtained. For example, if the document at issue is dated Jan. 1, 2016, and contains the text "this Monday," embodiments can translate this to the Monday of the same week and assign a date for that day. This data is utilized in the events timeline for the document as described herein.

Finally, relations between each of the objects/entities are made to the classes of the objects or entities. This step determines the relationship between two entities (which are previously identified by entity extraction engine 212). The relationship can be, for example, a verb or an adverb that defines an action or an event that happened between the two entities. Consider the sentence, "Josh applied to the job." The two entities are "Josh" and "the job," while the relation is "applied to." In embodiments, relations between three or more entities can similarly be determined.

Figure 7:
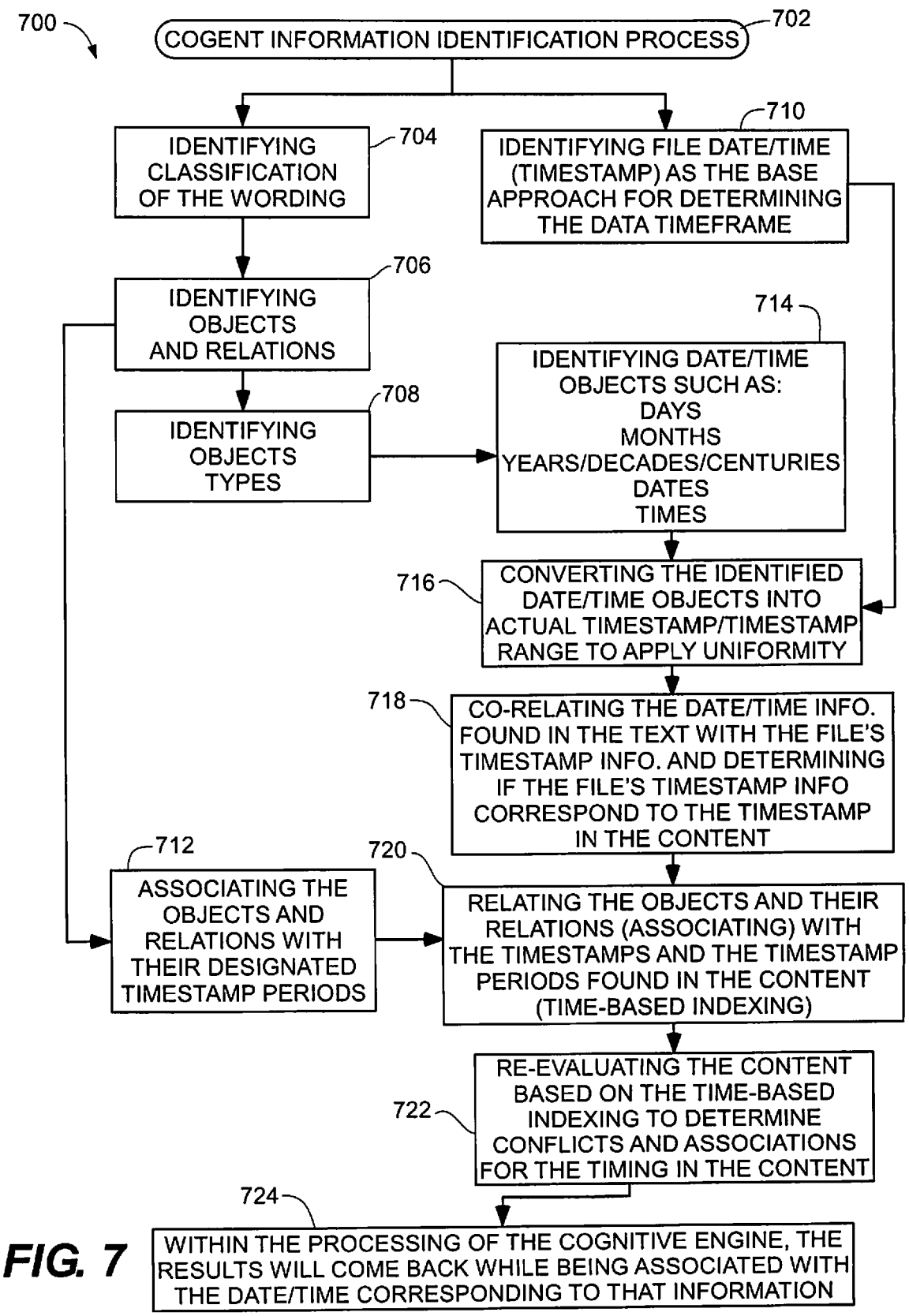
FIG. 7 is a flowchart of method of time-based indexing for a system for analyzing digital content, according to an embodiment.

After obtaining and linking the objects, their classes and their relations, the cognitive engine incorporates a date/time data point ($4^{th}$ dimension) for these elements. For example, a timeline format can be utilized such that the entity and relations associated with it can be stored or presented within that timeframe. As mentioned above with respect to FIG. 2, entity extraction engine 212 can generate a date/time timestamp for data in the dataset. For example, referring to FIG. 7, a flowchart of method of time-based indexing for system 200 is depicted.

Method 700 begins at 702 as a function of sub-engine processing of cogent information engine 206. As described in detail above, at 704, the text of a sentence of the digital content is classified. At 706, objects and relations are identified. From 706, objects and relations are associated with designated timestamp periods, if available. Further, from 706, at 708, object types are identified.

In parallel, or serially with the object and relation identification of 704-708, a file date/time (timestamp) can be identified at 710. In an embodiment, the file timestamp is a base data point for determining the data timeframe.

From 708, as described above, at 714, date/time objects are identified within the analyzed text. For example, date/time objects can include days, months, years, decades, centuries, dates, or times.

At 716, the file timestamp generated at 710 is utilized in combination with any date/time objects identified at 714. Particularly, date/time objects are converted into timestamp data points. In embodiments, date/time data points are applied to the data timeframe to obtain uniformity with the timestamp data.

At 718, a correlation of date/time objects identified within the text (and converted into timestamp data points) is made with the file timestamp. In embodiments, a determination is made as to whether the file timestamp information corresponds to the date/time objects in the text.

At 720 the objects and their respective relations are associated with the file timestamp and the date/time objects identified within the text (converted into timestamp data points). In embodiments, this is referred to as time-based indexing.

At 722, the text is reevaluated based on the time-based indexing to determine any conflicts or associations for the timing in the text. Once a uniform time-based indexing is established, conflicts and associations, or in other words, time-based context for the text is possible.

At 724, a time-based indexed output is returned. In an embodiment, results from cognitive engine 202 are output such that they are associated with date/time information corresponding to that output information.

In an embodiment, within the process of obtaining entities and their relations, cogent information engine 206 is further configured to identify and store information about the source of the entities and relations derived. For example, source information can include references notation, including a document name, ID number, date/time and page and line number(s) where the entity/relation data was derived.

After an identification of entities and relations, a comparison of these relations can be made within the document itself and within the dataset for any similar entities. Subsequently, a comprehensive analysis for the variances (differences) in the relations can be provided. For example, pattern recognition based on any differences between the entity/relation information with respect to the date/time information contained in the data set can be utilized.

Figure 8:
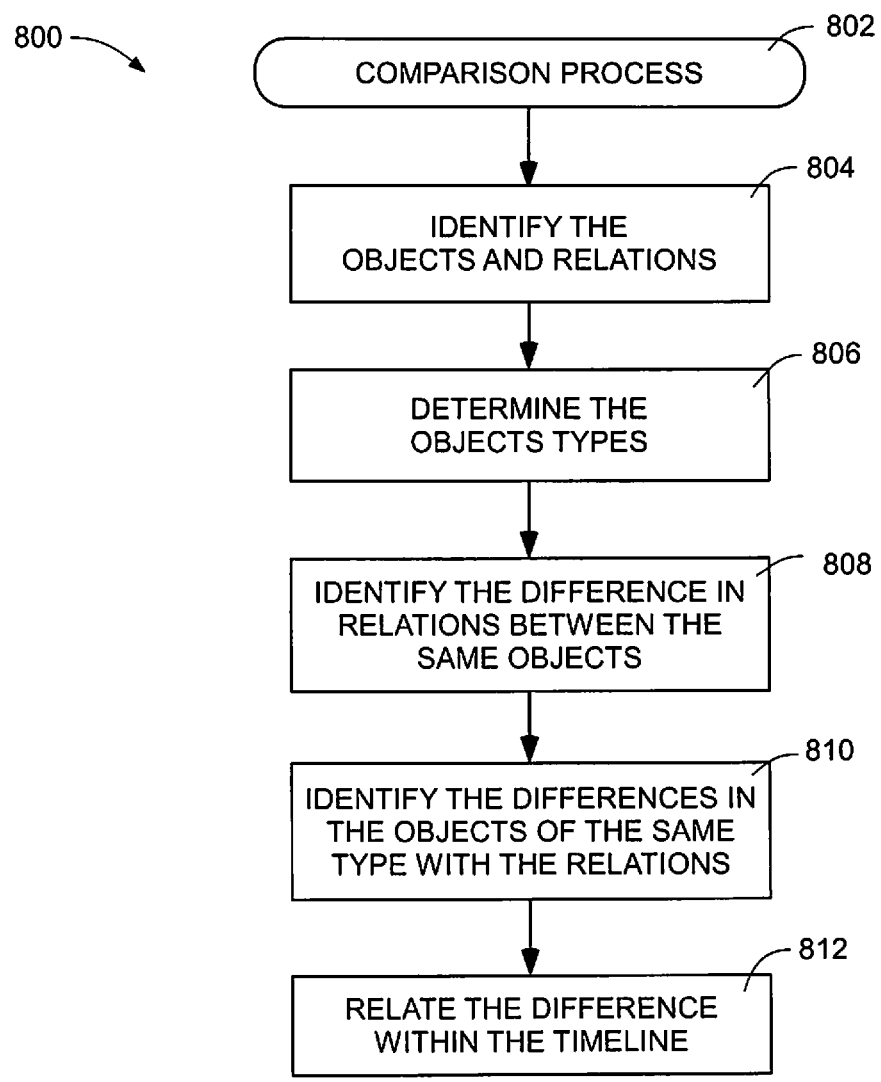
FIG. 8 is a flowchart of a method of identifying differences in digital content, according to an embodiment.

Referring to FIG. 8, a flowchart of a method 800 of identifying differences in digital content is depicted, according to an embodiment. At 802, the comparison process is initiated. In an embodiment, the method can begin 802 by a function call, user operation, or any other appropriate initialization. At 804, objects and relations are identified. At 806, object types are identified for each of the objects. At 808, differences in relations between the same objects are identified. At 810, differences in objects of the same type with the same relations are identified. At 812, any identified differences in objects or relations can be presented or otherwise captured on the timeframe or timeline.

Figure 9:
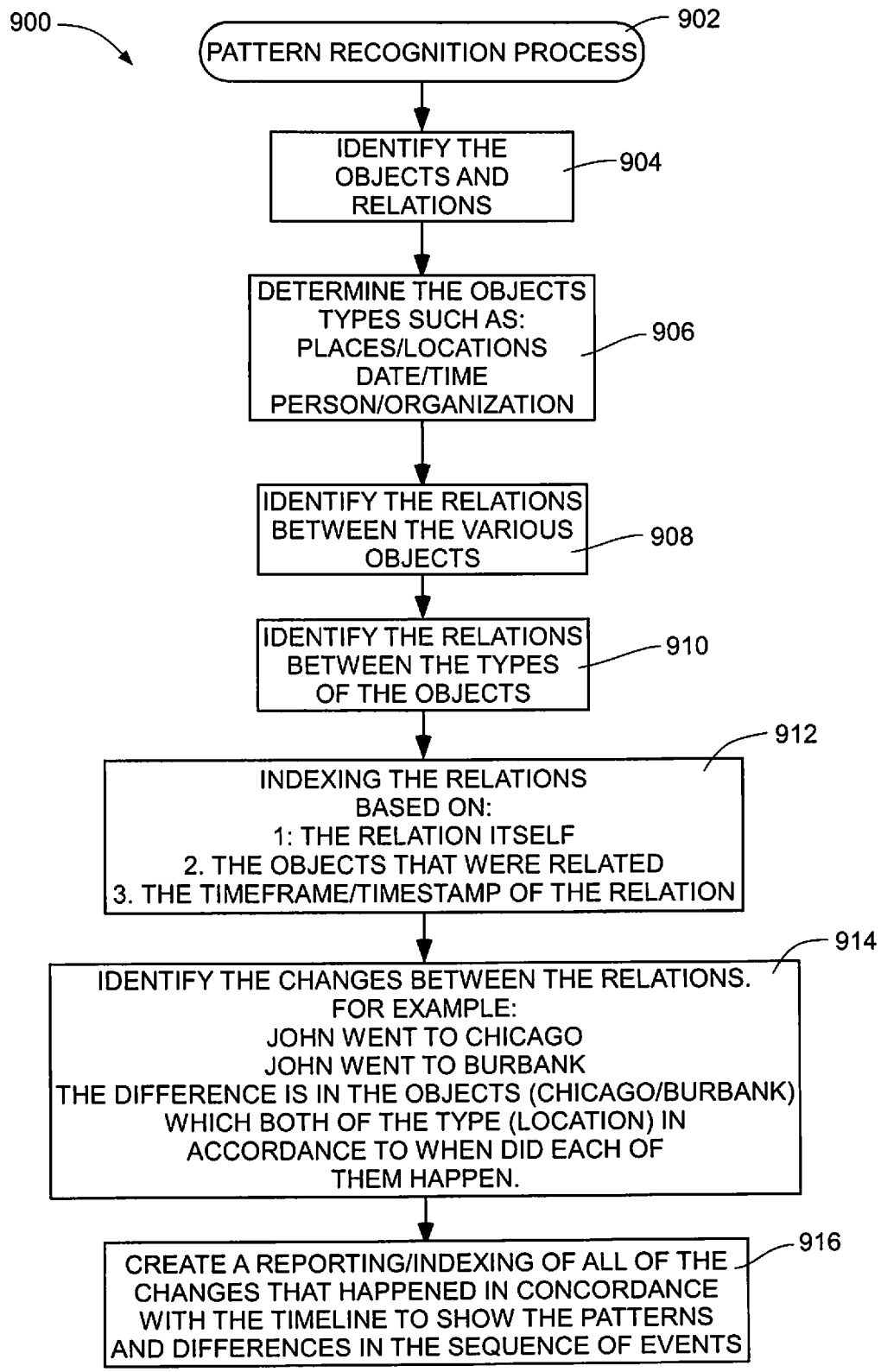
FIG. 9 is a flowchart of a method of pattern recognition for digital content, according to an embodiment.

More particularly, referring to FIG. 9, a flowchart of a method 900 of pattern recognition for digital content is depicted, according to an embodiment. For example, pattern recognition engine 216 can be configured to determine differences in relations, such as whether a particular relation is different or if the object is different in the scope with respect to the timestamp (or its period).

At 902, the pattern recognition process is initiated. In an embodiment, the method can begin 902 by a function call, user operation, or any other appropriate initialization. At 904, objects and relations are identified. At 906, object types are identified for each of the objects. For example, object types can include places/locations, date/time, or persons/organizations. At 908, relations between the various objects can be identified. At 910, relations between the object types of the various objects can be identified. At 912, the relations can be indexed. For example, relations can be indexed based on the relation itself, the objects that were related, or the timeframe/timestamp of the relation. At 914, changes between the relations can be identified. In the example provided in FIG. 9, for the text "John went to Chicago" and "John went to Burbank," the difference is in the objects (Chicago, Burbank), both of which are of the type "location." A change can be identified based on when the location change happened. At 916, a reporting or indexing of all of the identified changes can be made with respect to a timeline in order to show patterns and differences in the sequence of events. In embodiments, the timeline indexing can be stored in a coupled database. In other embodiments, the reporting can be presented to a user via a graphical user interface (GUI).

According to an embodiment, a cognitive engine can utilize online databases or websites via a concept search mechanism. For example, referring again to FIG. 2, the online database or websites utilized by system 200, and particularly, cognitive engine 202, can include external resources 204. Initially, a concept searching comprises an initial search for concepts. Depending on the application of the search, concept searching can be conducted on external resources 204 or an input text. Subsequently, multiple searches can be conducted on external resources 204, including resources such as dictionaries and thesauruses, to find information on the found concepts. As a result, meanings of particular concepts can be determined. Particularly, because synonyms and related definitions are utilized, external resources need not include the exact same wording as the original concept.

After the search results are obtained, a cogent information processing is conducted on the results to identify the cogent or important information. In an embodiment, as described above, cogent information engine 206 identifies the cogent information. A document comparison is then conducted between the dataset and the search results. In an embodiment, as described above, document comparison engine 210 is configured for document comparison. According to embodiments, cognitive engine 202 identifies the null hypothesis, or the important information that is missing from a document. Missing information can be that which is intentionally left out or mistakenly omitted. Cognitive engine 202 can identify missing information and generate a corresponding output.

Two types of null hypothesis can be identified by embodiments of cognitive engine 202. A first type can be referred to as "within the dataset." When conducting the cognitive comparison, if a first document contains information on a specific topic, but somewhere else within the dataset, a second document describes the same topic, but with additional information, cognitive engine 202 will identify missing information (the null hypothesis) from the first document, or information that was missing or not included where it was applicable.

A second type can be referred to as "not within the dataset." In a particular dataset, if the cognitive engine finds information from other sources (outside the dataset), related to the dataset but not in the dataset itself, cognitive engine 202 will identify this as missing information (the null hypothesis). In an embodiment, such information can be identified by a cognitive search. Information can therefore be determined that should be included in the dataset but is not. In other words, the null hypothesis is utilized know what information is not present and when that information is not present. In embodiments, external data can be utilized to identify missing information.

Figure 10:
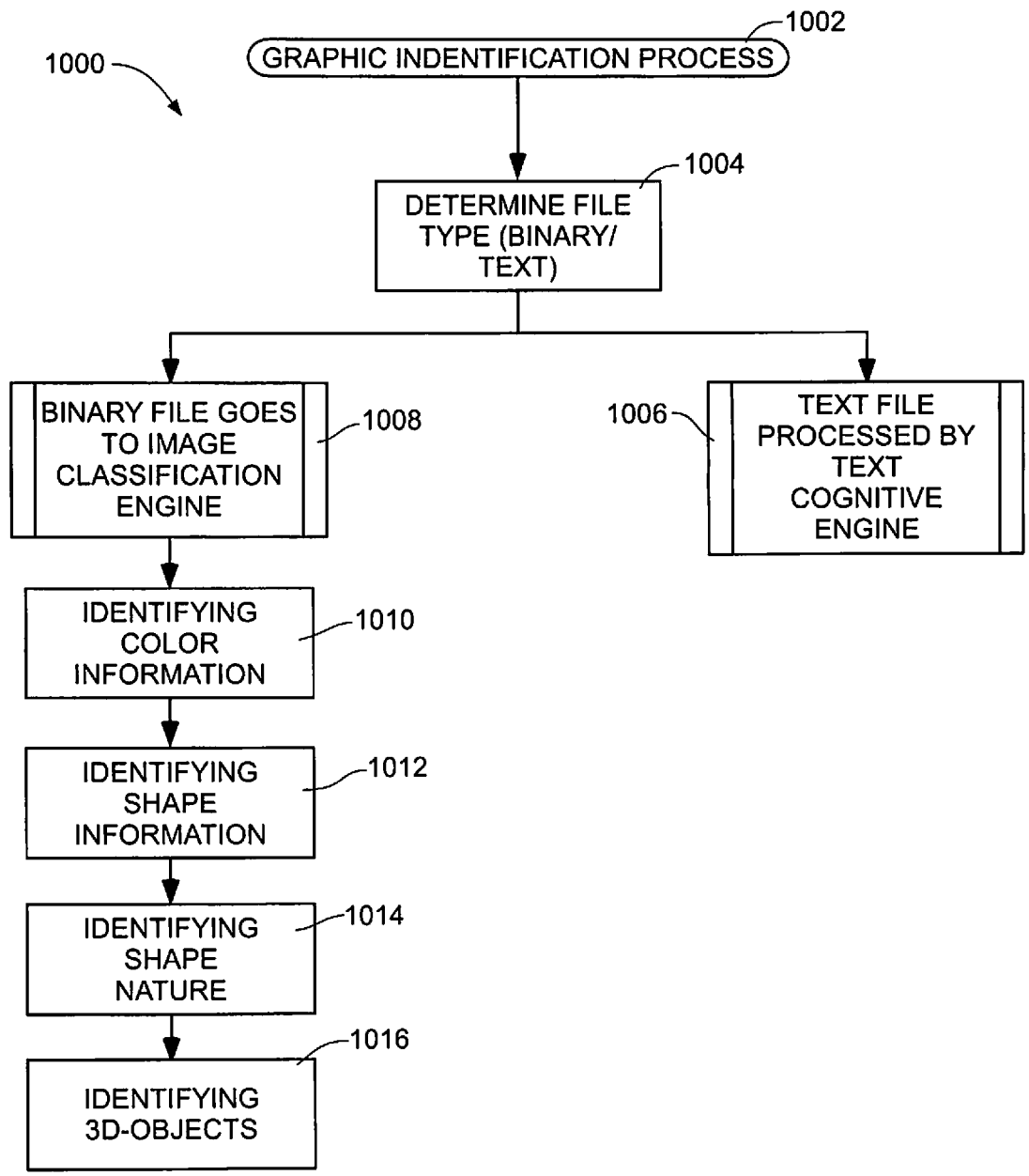
FIG. 10 is a flowchart of a method of file identification and analysis, according to an embodiment.

Referring to FIG. 10, a flowchart of a method 1000 of file identification and analysis is depicted, according to an embodiment. According to embodiments, cognitive engine 202 can distinguish between binary data (images) and text-based data in a dataset. For example, at 1002 method 1000 processing begins. At 1004, a file type is determined. In an embodiment, cognitive engine 202 can distinguish data types by reading the file signature (file binary header information) contained in the file and matching the file signature with a list of known header signatures. Such an analysis does not depend on the file extension or MIME type of the file, as they both can be misleading in certain cases, but rather the actual data that contained in the file. At 1006, if the file type is determined to be a text file, the text is processed by a text processing cognitive engine.

At 1008, if the file type is determined to be a binary file (image), the file or data corresponding to the file content is sent to an image classification engine. An image classification engine is configured to convert the file content into a byte array and processes the file content to determine the classification of the image type. In an embodiment, the classification of the image is determined according to a multi-level analysis such as 1010-1016.

For example, at 1010, color information is identified. In an embodiment, identifying color information includes identifying adjacent nodes and their color values, such as grayscale (GS), red-green-blue (RGB), or cyan-magenta-yellow-key (black) (CMYK). At 1012, shape information is identified. For example, shape information can include identifying inversed colors or semi-inversed colors, with particular attention to contrast information. At 1014, shape information is identified. For example, a generalized nature of the shapes can be determined, such as ovals, lines, rectangles, and so on. Optionally, at 1016, a supplemental operation to identify any 3D objects contained in the image files is conducted. For example, 3D objects can be identified by applying contrast and inverse filters to the image.

Figure 11:
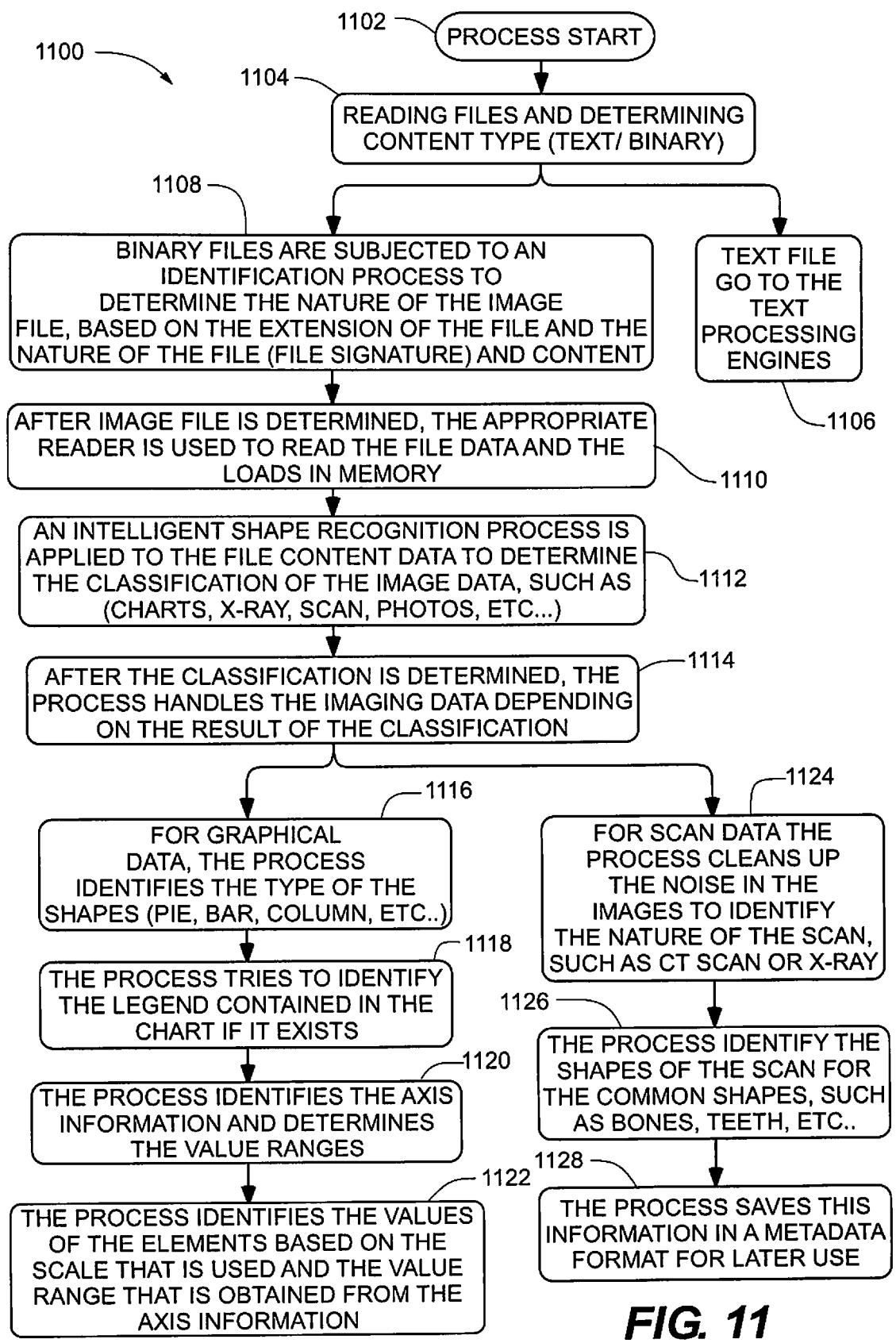
FIG. 11 is a flowchart of a method of file identification and analysis, according to an embodiment.

Referring more particularly to FIG. 11, a flowchart of another embodiment of a method of file identification and analysis is depicted. Method 1100 begins at 1102. Similar to method 1000, at 1104, a file type is determined. At 1106, if the file type is determined to be a text file, the text is processed by a text-processing cognitive engine.

At 1108, if the file type is determined to be a binary file (image), the file or data corresponding to the file content is sent to an image classification engine. In an embodiment, binary files are further subjected to an image file identification process. For example, the particular type of image file can be identified based on the extension of the file, the file signature, or the actual content of the image file. At 1110, after an image file is determined, an appropriate image file reader is used or executed to read the file data and load the file data into memory. At 1112, a shape recognition processing can be executed. For example, the shape recognition processing can be applied to the file data content to determine a classification of the image data, such as "chart," "x-ray scan," "photograph" and so on. At 1114, after a classification is determined, method 1100 reaches a decision point to process or handle image data differently depending on the classification.

At 1116, if the image classification is for example "chart data," method 1100 identifies the type of the shapes contained in the image, such as pie, bar, column, etc. At 1118, a legend for the chart is identified, if present. At 1120, axis information and relative value ranges are identified. At 1122, values of various elements in the chart are identified, based at least on the scale that is used and the value range obtained from the axis information.

At 1124, in another example, if the image classification is for example "scan data," method 1100 can clean any noise out of the image. Subsequently, the type of scan, such as computerized tomography (CT) or x-ray can be identified from the image. At 1126, shapes contained in the image scan are identified, such as bones, teeth, etc. At 1128, the identified or determined data is stored as metadata for later use.

One skilled in the art will readily appreciate that the classifications of "chart" implemented beginning at 1116, and "scan" implemented beginning at 1124 are mere examples. Other classifications of data can be analyzed and handled differently.

As a result, embodiments can identify particular objects contained in various images and subsequently read cogent information from the objects to obtain an understanding of the images. For example, if the image is a graph, embodiments can identify the graph as a particular type of graph, such as a bar graph, and determine content within the graph, such as numbers and identifications indicating particular data.

According to embodiments, after information in the digital content is fully identified, a subsequent process of obtaining actionable information is executed. In an embodiment, this process reads the information contained in the cogent information and the overall results to derive an action or multiple actions depending on the data set. In an example, two types of actions can be utilized.

First, a result type can be a single action. The single action will produce a single result depending on the context of the dataset. For example, single action result may be a single sentence, single word or a number.

Second, a result type can be a multiple action. The multiple action comprises a multi-step or multiple action output. This can be executed when there is a requirement for a stepped process or multiple elements that will generate suitable results, depending on the input and desired output. A cascading action, iterative action, or recursive action can also be output as required by the application and the dataset.

In embodiments, the cognitive engine can be configured to re-evaluate, save and retrieve the resulted actions and cogent information with their co-relation to the timeline to re-use that information in order to update the knowledgebase with the latest information obtained from the dataset, plus any external databases. There is thus no need to manually update data previously accessed by the cognitive engine.

In an embodiment, a pre-processing step is conducted to determine the required processing power needed for processing the dataset. Pre-processing thereby achieves faster run-time during processing.

Embodiments of system 200 can further include a computer clustering sub-system that coordinates multiple clusters to allow parallel processing of the dataset. The clustering sub-system can further include an internal auto-management function for the server clusters that is configured to start and stop and control the processing units or servers.

In an embodiment, a one-to-one relationship of document-to-server can be utilized for simple digital content processing. However, other embodiments utilize other techniques to determine the number of instances of servers and how to process the digital files.

In an embodiment, a file can be received by the engine with the expectation that other file processing will be suspended until that file processing is complete.

In another embodiment, digital files can be loaded into a database. Subsequently, sentences in the files can be combined or otherwise concatenated into a large chunk of data or packet. The number of sentences in the chunk can be determined by the number of cores available for each server. In embodiments, testing and performance benchmarking indicates that two threads (two sentences) can be provided to each core of the server at the same time to obtain optimum results.

The server clustering process can include reading the size of the files (or the size of the directory in general) and approximating number of sentences found based on the file size. This approximation is very fast because it doesn't involve reading all the files. Rather, a determination of the file size/folder size from the operating system is sufficient to determine the approximate number of sentences in the file because a sentence is generally formed of a known number of characters according to the particular language of the text.

Each chunk of data is then sent to a server in the cluster for processing. Because the process is based on threads that rely on the number of cores in the server, the processing time of each chunk will be approximately equal among the servers, which in turn yields maximum performance utilization.

In operation, a cognitive engine such as cognitive engine 202 of system 200 can identify and extract meaningful information from digital content.

One or more of the sub-engines of cognitive engine 202 can perform a pre-read of the document(s) in the dataset of digital content. For example, cogent information engine 206, entity extraction engine 212, and concepts extraction engine 214 can be executed during the pre-read or pre-processing. The pre-read can determine the size and number of documents and the amount of processing needed. In an embodiment, the amount of processing needed can be determined by conducting a benchmark for a few documents, recording the amount of time needed to process those documents using cogent information engine 206, then determining the best number of instances to launch in order to pre-process the entire data set. Pre-processing the data set can comprise the process of executing cogent information engine 206, entity extraction engine 212, and concepts extraction engine 214 and storing their respective output in a database or knowledgebase.

After the number of servers or instances is determined, cognitive engine 206 can load up the required number of servers by initiating API calls to the main server, which in return launches the required number of servers via the provider's tools. The main server then identifies the IP addresses for the processing servers and adds them to the database so they are accessible to all sub-engines.

The data set is pre-processed by taking the first document or file in the dataset and transmitting the file to the first available or otherwise making the data of the file available to the first available server for pre-processing. In an embodiment, a TCP/IP connection based on the Server/Client model can be utilized for file transmission. The main server can include a client that "requests" the server from the available server IP addresses in the database and calls the server on a specific port number for that engine. Each sub-engine can be configured to listen on a specific port number on the server.

In an embodiment, cogent information engine 206 is the first sub-engine that is executed during normal processing (non-preprocessing). As described above, cogent information engine 206 determines the cogent (important or useful) information contained in the digital content. In particular, cogent information engine 206 first executes a "reading" of text contained in the document. Cogent information engine 206 then identifies the part of speech for every word in the digital text. In embodiments, punctuation is also utilized, if available. Cogent information engine 206 then identifies references (words that reference something else) such as (they, them, it, he, she, etc.) and finds the subject word.

After identifying the POS and references, cogent information engine 206 can execute a parsing tree process on text of the digital content. In an embodiment, the parsing tree process reads the POS information within the sentence in light of the POS identification, then determines the appropriate structure of that sentence. After determining the structure for each sentence, cogent information engine 206 can subsequently identify complete sentence meaning by applying the grammatical tests to each of the sentences, thereby identifying which sentences qualify to be a complete meaning sentence. Of course, cogent information engine 206 relates the reference words to their corresponding subject when used in the sentence.

After complete sentence meanings are identified, the sentences are weighted. Sentences having similar meanings to another will have similar weightings. In an embodiment, weightings are determined by utilizing a dictionary and/or thesaurus to identify those sentences that relate and have similar meanings. An inference engine can also be used to determine whether the sentences are related.

Cogent information engine 206 then skips duplicate sentences, and the true complete meaning sentences are subjected to another level of inference. This effectively gives context to the unrelated sentences via a weighting process. The resulting sentences are then extracted as being the cogent information contained in the document.

In an embodiment, concept extraction engine 214 is the next sub-engine that executes. As described above, concept extraction engine 214 identifies concepts contained in the digital content. In embodiments, concepts include nouns that identify a point, whether the noun is with or without a property. Concept extraction engine 214 involves applies the POS tagging to identify the classification of the words in the sentences, and correspondingly identifies the noun phrases as the concepts. After the concept identification is complete, the results are saved in the knowledgebase for further processing as needed.

Entity extraction engine 212 is the next sub-engine that executes. As described above, entity extraction engine 212 identifies entities contained in the text. In an embodiment, entity extraction engine 212 identifies objects as the nouns or noun references within the text. The identification process begins with a POS identification of the nouns in the sentences. A parsing tree can be utilized to identify the entities that are related via a "relation," which is typically a verb word or phrase that identifies an "action" that happened between the two entities.

After the entities are identified, entity extraction engine 212 classifies the entity or object. In an embodiment, the classification is determined by subjecting an entity to a dictionary while utilizing its POS class, thereby defining the object. Examples of entity classes are persons, locations, date/time, and organizations, as described above. Entity information, plus any classification is stored in the knowledgebase for further processing as needed.

Pattern recognition engine 216 can then be executed. In an embodiment, pattern recognition engine 216 can be a sub-engine of entity extraction engine 212. Pattern recognition engine 216 reads in any relations that were identified by entity extraction engine 212. Pattern recognition engine 216 then compares the relations found between the entities. In an embodiment, a citation of a change in relations between the same entities in a timeline fashion can be stored or presented to the user. Pattern recognition engine 216 also identifies the relationships between the classes of these entities. In case there was a change between the entities within the timeline, this analysis is conducted among all of the documents in the data set to identify the change of the patterns between documents.

Question answering engine 208 then reads the entire document or multiple documents of the digital content and identifies the concepts contained in these documents. Question answering engine 208 then reads an input question and determines the concepts contained in the question. An inference is then made between the sentences that contain that concept with the documents of the digital content. A reference or citation with the actual line number(s) of where an answer was found or used as the basis for an inference can also be stored or presented.

Document comparison engine 210 next reads the cogent information contained in each document (which was previously pre-processed) and conducts a similarity/difference check. In an embodiment, document comparison engine 210 conducts a similarity/difference check by subjecting the concepts and the entities/relations to an inference engine. In an embodiment, this is enabled because the comparison is only conducted through elements that match. In other words, document comparison engine 210 provides differences only for the related items contained in the compared documents, which thereby yields more accurate results by comparing only the pieces of information that are already known to be related. As a result, differences that relate to the same subject matter and not to different subject matter are identified. Document comparison engine 210 is thus able to compare apples-to-apples because the engine can utilize the information that has the same context.

Document comparison engine 210 then searches various websites or databases (such as external resources 204) for information related to the concepts identified in the digital content. In an embodiment, conducting the search for information on concepts includes searching for the concept itself in addition to utilizing the various digitally-accessible dictionaries and thesauruses to look for the meanings, definitions, and synonyms of the concept.

After the concept search results are obtained, the results are then subjected to cogent information engine 206, which identifies the cogent information. In an embodiment, the concept search results are then subjected to a document lexical comparison that identifies any missing information from a particular document.

Optionally, non-text files in the dataset can be identified. In an embodiment, file signatures for the binary files can be identified, and a classification can be made based on the non-text file content, plus the image type, such as GS, RGB, or CMYK. The image files are then respectively converted into byte arrays. Adjacent nodes are detected within the image to identify the nature of the objects displayed in the image file. Once adjacent nodes are and the objects are characterized, the image information is read to for any useful information such as statistical information (graphs) or imaging information such as x-ray scans.

After cogent information is obtained from the digital content, an action set can be created from the dataset. An action set can be based on the relative understanding of the cogent information found in the data set. There are two types of the actions that the process can generate, depending on the application of the dataset. The actions can be a single sentence, word, figure or a series of information, such as stepped actions or combination of elements.

After the action or series of actions are generated, the sub-engines of cognitive engine 202 enter a background process of auto-learning. This auto-learning process stores the cogent information and respective actions in the system. In embodiments, the auto-learning process also stores the cogent information and respective actions according to a timeline generated for the information. As a result, the system can verify and validate the next iteration of similar data in order to make a logical comparison that involves both results and their actions to re-validate and re-assess the new results and actions. The auto-learning process can also read the dataset and compare the cogent information that is contained in the initial run with subsequent runs to identify if any additional cogent information should be accounted for the next time the system executes.

According to embodiments, the systems and methods described herein can operate with digital material written in a myriad of languages. For example, multi-byte languages, such as Korean, Chinese (both Simplified & Traditional), Japanese, and Arabic can be "read" by the system. An intermediate translation sub-process can process the non-English text for use by the system.

Figure 12:
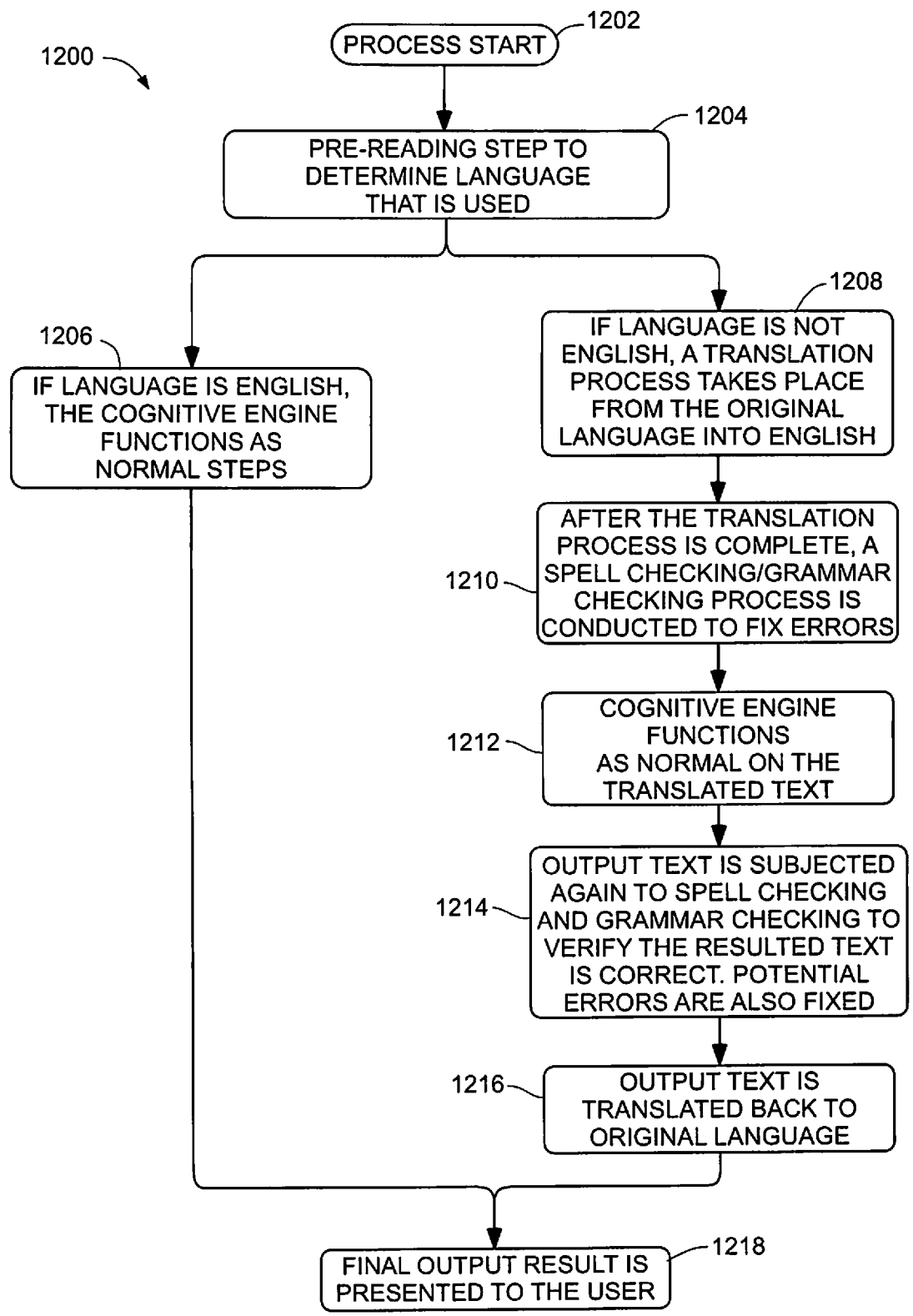
FIG. 12 is a flowchart of a method of a language translation sub-processing, according to an embodiment.

Referring to FIG. 12, a flowchart of a method 1200 of a language translation sub-processing is depicted, according to an embodiment. At 1202, the process starts. At 1204, a pre-reading step determines the language of the digital material. At 1206, if the language of the digital material is English, the cognitive engine functions as described herein. At 1218, the final output result is presented to the user (in English).

However, at 1208, of the language of the digital material is not English, a translation process operates to transform the original language to English (prior to substantive processing by the cognitive engine). At 1210, after the translation process of 1208 has transformed the original language, a spellchecking/grammar checking process is conducted to correct any errors prior to operation on the text by the cognitive engine. At 1212, the cognitive engine processing and sub-processing is conducted on the translated text. At 1214, the output text is subjected again to spellchecking/grammar checking to verify the resulting text is correct. Any errors are also fixed. At 1216, the output text is translated back to its original language. At 1218, the final output result is presented to the user.

The engines and methods described herein can be implemented to include user interfaces to facilitate interaction with a user. For example, referring to FIGS. 13A-13F, screenshots of various user interfaces are depicted.

Referring to FIG. 13A, a screenshot of a cogent information identification interface 1300 is depicted, according to an embodiment. Using the "Identify Cogent Information" tab on the primary user interface, cogent information identification interface 1300 can be selected. Cogent information identification interface 1300 can be utilized to select or otherwise identify one or more files. A cogent information engine such as cogent information engine 206 can be subsequently executed and any corresponding cogent information found in the one or more files can be displayed or presented to the user using cogent information identification interface 1300.

Referring to FIG. 13B, a screenshot of a question interface 1302 is depicted, according to an embodiment. Using the "Answer a Question" tab on the primary user interface, question interface 1302 can be selected. Question interface 1302 can be utilized to receive or otherwise input a "question." One or more files can be selected or otherwise identified by the user. An "answer" to the question can be derived from the selected files, by for example, a question answering engine such as question answering engine 208, and subsequently displayed or presented to the user using question interface 1302.

Referring to FIG. 13C, a screenshot is a concept identification interface 1304 is depicted, according to an embodiment. Using the "Identify Concepts" tab on the primary user interface, concepts identification interface 1304 can be selected. Concepts identification interface 1304 can be utilized to select or otherwise identify one or more files. A concept extraction engine such as concept extraction engine 214 can be subsequently executed and any corresponding concepts found in the one or more files can be displayed or presented to the user using concept identification interface 1304.

Referring to FIG. 13D, a screenshot of a cognitive comparison engine interface 1306 is depicted, according to an embodiment. Using the "Cognitive Comparison" tab on the primary user interface, cognitive comparison engine interface 1306 can be selected. Cognitive comparison engine interface 1306 can be utilized to select or otherwise identify two files. A comparison engine such as document comparison engine 210 can be subsequently executed and any differences found between the files can be displayed or presented to the user using cognitive comparison engine interface 1306.

Referring to FIG. 13E, a screenshot of an entity and relation identification interface 1308 is depicted, according to an embodiment. Using the "Identify Entities" tab on the primary user interface, entity and relation identification interface 1308 can be selected. An entity extraction engine such as entity extraction engine 212 can be subsequently executed to identify entities in the selected one or more files, along with relations between the entities. In embodiments, as shown in FIG. 13E, a classification can be made for the various entities. A source location can likewise be provided for each entity.

Referring to FIG. 13F, a screenshot of a pattern identification interface 1310 is depicted, according to an embodiment. Using the "Identify Patterns" tab on the primary user interface, pattern identification interface 1310 can be selected. A pattern recognition engine such as pattern recognition engine 216 can be executed to identify changes or patterns between relations of the entities. The changes or patterns can be displayed or presented to the user using pattern identification interface 1310.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A system for analyzing digital content available via a networked resource, the system comprising:
 a cognitive engine including a processor and an operably coupled memory, the memory comprising instructions that, when executed, causes the processor to implement:
  a pre-reading of the digital content to determine a size of the digital content, a number of documents in the digital content, and an amount of processing needed to completely pre-process the digital content by selecting a subset of the digital content,
   processing the subset of the digital content using a subset of cognitive engine resources, the cognitive engine resources including a cogent information engine, a concept extraction engine, and an entity extraction engine, and
   determining a benchmark amount of time to process the subset of the digital content;
  a pre-processing of a full set of the digital content by selectively loading a plurality of cognitive engine instances, wherein the number of the plurality of cognitive engine instances that are loaded is based on a scaling of the benchmark amount of time and the size of the subset of the digital content from the pre-reading;
  wherein the cogent information engine is configured to:
   parse a document from the digital content,
   identify a part of speech for every word in the document,
   identify a subject word for all reference words in the document,
   generate a parsing tree for the document to determine a sentence structure for every sentence in the document based on the parts of speech and the subject words,
   determine a sentence meaning for every sentence in the document based on the sentence structure and a plurality of grammatical tests,
   determine a weighting for each sentence wherein sentences having similar sentence meanings have similar weightings; and
   output a subset of the sentences based on the weighting as cogent information of the document;
  the concept extraction engine configured to determine noun phrases in the cogent information based on the part of speech identification, wherein each noun phrase is a digital content concept;
  the entity extraction engine configured to:
   identify a plurality of entities for each of the identified digital content concepts and one or more relations between the plurality of entities based on the part of speech identification, and
   classify the plurality of entities; and
  a pattern recognition engine configured to
   determine a difference in relations between entities of the identified digital content concepts,
   generate an output of the differences relative to a time marker, and
   provide a conclusory action for the digital content.

2. The system for analyzing digital content of claim 1, wherein the cognitive engine further comprises a question answering engine configured to:
 receive an input question;
 determine at least one noun phrase in the input question, wherein each noun phrase is an input concept;
 perform an inference between the input concept and the digital content concepts; and
 output one of the sentences as an answer to the input question based on the inference.

3. The system for analyzing digital content of claim 2, wherein the question answering engine is further configured to output a citation to the outputted sentence relative to the digital content.

4. The system for analyzing digital content of claim 1, wherein the digital content comprises a first document and a second document, and the cognitive engine further comprises a document comparison engine configured to:
 receive a first sentence of the first document;
 receive a second sentence of the second document;
 determine at least one overlapping concept, overlapping entity, or overlapping relation between the first sentence and the second sentence;
 perform an inference on the at least one overlapping concept, overlapping entity, or overlapping relation; and
 output a difference based on the inference.

5. The system for analyzing digital content of claim 4, wherein the document comparison engine is further configured to search a second networked resource for information related to a digital content concept.

6. The system for analyzing digital content of claim 5, wherein the document comparison engine is further configured to identify information missing from the first document and the second document relative to the second networked resource.

7. The system for analyzing digital content of claim 1, wherein the cogent information engine is configured to iteratively process all documents in the digital content.

8. The system for analyzing digital content of claim 1, wherein determining the weighting for each sentence comprises using an inference to identify sentences having a most complete meaning according to a completeness value.

9. The system for analyzing digital content of claim 1, wherein the one or more relations is an action between two entities.

10. The system for analyzing digital content of claim 1, wherein the time marker is determined relative to a digital content document timestamp.

11. The system for analyzing digital content of claim 1, wherein determining the amount of processing needed to analyze the digital content comprises:
 conducting a benchmark processing for a subset of the digital content;
 recording a time duration for the benchmark processing; and
 determining a number of cognitive engine instances to launch based on the time duration.

12. The system for analyzing digital content of claim 1, wherein determining the amount of processing needed to analyze the digital content comprises approximating a number of sentences in the digital content based on the size of the digital content.

13. A method for analyzing digital content available via a networked resource with a cognitive engine including a processor and an operably coupled memory, the method comprising:
pre-reading the digital content with the processor to determine a size of the digital content, a number of documents in the digital content, and an amount of processing needed to completely pre-process the digital content by
selecting a subset of the digital content,
processing the subset of the digital content using a subset of cognitive engine resources, the cognitive engine resources including a cogent information engine, a concept extraction engine, and an entity extraction engine, and
determining a benchmark amount of time to process the subset of the digital content;
pre-processing of a full set of the digital content by selectively loading a plurality of cognitive engine instances, wherein the number of the plurality of cognitive engine instances that are loaded is based on a scaling of the benchmark amount of time and the size of the subset of the digital content from the pre-reading;
wherein the cogent information engine is configured to:
read a document from the digital content;
identify a part of speech for every word in the document;
identify a subject word for all reference words in the document;
generate a parsing tree for the document to determine a sentence structure for every sentence in the document based on the parts of speech and the subject words;
determine a sentence meaning for every sentence in the document based on the sentence structure and a plurality of grammatical tests;
determine a weighting for each sentence, wherein sentences having similar sentence meanings have similar weightings;
output a subset of the sentences based on the weighting as cogent information of the document;
determine noun phrases in the cogent information based on the part of speech identification, wherein each noun phrase is a digital content concept;
identify a plurality of entities for each of the identified digital content concepts and one or more relations between the plurality of entities based on the part of speech identification;
classify the plurality of entities;
determine a difference in relations between entities;
generate an output of differences relative to a time marker; and
provide a conclusory action for the digital content.

14. The method for analyzing digital content of claim 13, further comprising:
receiving, with the processor, an input question;
determining, with the processor, at least one noun phrase in the input question, wherein each noun phrase is an input concept;
performing, with the processor, an inference between the input concept and the digital content concepts; and
outputting, with the processor, one of the sentences as an answer to the input question based on the inference.

15. The method for analyzing digital content of claim 14, further comprising outputting, with the processor, a citation to the outputted sentence relative to the digital content.

16. The method for analyzing digital content of claim 13, wherein the digital content comprises a first document and a second document, and the method further comprises:
receiving, with the processor, a first sentence of the first document;
receiving, with the processor, a second sentence of the second document;
determining, with the processor, at least one overlapping concept, overlapping entity, or overlapping relation between the first sentence and the second sentence;
performing, with the processor, an inference on the at least one overlapping concept, overlapping entity, or overlapping relation; and
outputting, with the processor, a difference based on the inference.

17. The method for analyzing digital content of claim 13, wherein the one or more relations are indexed based on at least one of the one or more relation, a related object, or a timestamp of the one or more relation.

18. The system for analyzing digital content of claim 1, wherein the pre-reading of the digital content generates at least one reusable output used by the pre-processing.

19. The system for analyzing digital content of claim 18, wherein the at least one reusable output is extracted cogent information, an extracted concept, an extracted entity or object, or an extracted entity relation.

20. The system for analyzing digital content of claim 12, wherein the documents in the digital content are concatenated into a chunk of data, and wherein selectively loading the plurality of cognitive engine instances includes selecting a subset of the chunk of data from the digital content to be processed by each instance based on the number of sentences.

* * * * *